United States Patent
Imanaka et al.

(10) Patent No.: US 11,381,095 B2
(45) Date of Patent: Jul. 5, 2022

(54) MANAGEMENT DEVICE, ENERGY STORAGE APPARATUS, AND MANAGEMENT METHOD FOR ENERGY STORAGE DEVICE

(71) Applicant: GS Yuasa International Ltd., Kyoto (JP)

(72) Inventors: Yuki Imanaka, Kyoto (JP); Takeyuki Shiraishi, Kyoto (JP); Atsushi Fukushima, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 16/964,451

(22) PCT Filed: Jan. 18, 2019

(86) PCT No.: PCT/JP2019/001432
§ 371 (c)(1),
(2) Date: Jul. 23, 2020

(87) PCT Pub. No.: WO2019/150986
PCT Pub. Date: Aug. 8, 2019

(65) Prior Publication Data
US 2021/0050733 A1 Feb. 18, 2021

(30) Foreign Application Priority Data
Feb. 1, 2018 (JP) .............................. JP2018-016481

(51) Int. Cl.
*F02N 11/08* (2006.01)
*H02J 7/00* (2006.01)
(Continued)

(52) U.S. Cl.
CPC .......... *H02J 7/0029* (2013.01); *F02N 11/087* (2013.01); *F02N 11/0848* (2013.01);
(Continued)

(58) Field of Classification Search
CPC .................................................. F02N 2250/02
See application file for complete search history.

(56) References Cited

U.S. PATENT DOCUMENTS 5,477,130 A * 12/1995 Hashimoto ........... H02J 7/0036
429/96
5,835,989 A * 11/1998 Nagai ................... H02J 7/0031
320/112
(Continued)

FOREIGN PATENT DOCUMENTS

AU 2019375385 A1 * 6/2021 .......... F02N 11/0862
CA 2927892 A1 * 10/2016 .............. B60L 11/18
(Continued)

OTHER PUBLICATIONS

International Search Report (ISR) (PCT Form PCT/ISA/210), in PCT/JP2019/001432, dated Mar. 12, 2019.

Primary Examiner — Kevin R Steckbauer
(74) Attorney, Agent, or Firm — McGinn IP Law Group, PLLC

(57) ABSTRACT

A management device for an energy storage device, includes a processing unit that manages the energy storage device. When the management device for the energy storage device has lost power due to a voltage drop of the energy storage device, the processing unit determines whether cause of the power loss is an external short circuit between external terminals of the energy storage device or an engine start, and the processing unit executes a response operation according to the occurrence of the external short circuit in the case of the external short circuit, and does not execute the response operation in the case of the engine start.

20 Claims, 15 Drawing Sheets

(51) Int. Cl.
*B60R 16/023* (2006.01)
*B60R 16/04* (2006.01)

(52) U.S. Cl.
CPC ........ *F02N 11/0862* (2013.01); *H02J 7/0048* (2020.01); *B60R 16/0231* (2013.01); *B60R 16/04* (2013.01); *F02N 2200/061* (2013.01); *F02N 2200/064* (2013.01); *F02N 2250/02* (2013.01)

(56) References Cited

U.S. PATENT DOCUMENTS

| | | | | |
|---|---|---|---|---|
| 6,462,515 B1* | 10/2002 | Hanafusa | ............ | H01M 10/425 320/150 |
| 6,518,729 B2* | 2/2003 | Onishi | ............... | H02J 7/00304 320/136 |
| 6,630,815 B2* | 10/2003 | Hanafusa | ............ | H02J 7/0091 320/150 |
| 6,710,992 B2* | 3/2004 | Pannwitz | ............ | H02J 7/00308 361/90 |
| 6,800,960 B2* | 10/2004 | Koos | .................... | H02J 7/0031 307/10.6 |
| 7,181,340 B2* | 2/2007 | Endo | .................... | F02D 41/26 701/114 |
| 7,312,968 B2* | 12/2007 | Kahara | ................ | F02N 11/108 361/93.1 |
| 7,336,002 B2* | 2/2008 | Kato | .................... | H02J 7/1423 307/10.6 |
| 7,365,952 B2* | 4/2008 | Sato | .................... | H02J 7/00304 320/122 |
| 7,531,988 B2* | 5/2009 | Sato | .................... | H02J 7/00304 320/135 |
| 7,861,683 B2* | 1/2011 | Saitoh | ................ | F02N 11/0825 701/107 |
| 8,072,185 B2* | 12/2011 | Nam | .................. | H01M 10/488 320/116 |
| 8,369,056 B2* | 2/2013 | Senriuchi | ............... | H02H 3/066 361/93.1 |
| 8,689,758 B2* | 4/2014 | Nakamura | .......... | F02N 11/0848 701/107 |
| 8,852,770 B2 | 10/2014 | Langheim | ............ | H01M 50/581 429/61 |
| 9,123,978 B2* | 9/2015 | Langheim | ............ | H01M 50/572 |
| 9,263,889 B2* | 2/2016 | Origane | ................ | F02N 11/10 |
| 9,272,625 B2* | 3/2016 | Sonesson | ................ | B60L 50/16 |
| 9,353,717 B2* | 5/2016 | Rinze | .................... | F02N 11/08 |
| 9,422,910 B2* | 8/2016 | Gronwald | ............ | F02N 11/087 |
| 9,562,508 B2* | 2/2017 | Suzuki | .................. | F02N 15/067 |
| 9,581,123 B2* | 2/2017 | Betscher | ............... | F02N 11/087 |
| 9,611,825 B2* | 4/2017 | Nguyen | ................ | B60W 20/40 |
| 9,644,594 B2* | 5/2017 | Betscher | ............... | F02N 11/0862 |
| 9,657,704 B2* | 5/2017 | Suzuki | .................. | F02N 11/087 |
| 9,682,672 B2* | 6/2017 | Tofilescu | ............ | F02N 11/0814 |
| 9,806,593 B2* | 10/2017 | Nakayama | ....... | H03K 17/08128 |
| 9,860,986 B2* | 1/2018 | Tazarine | ................ | H05K 1/056 |
| 9,957,942 B2* | 5/2018 | Sierak | .................. | B60R 16/03 |
| 9,964,091 B2* | 5/2018 | Sierak | .................. | F02N 11/0862 |
| 10,033,213 B2* | 7/2018 | Dulle | .................... | H02J 7/007 |
| 10,065,585 B2* | 9/2018 | Iwasaki | .................... | H02J 7/00 |
| 10,279,761 B2* | 5/2019 | Taniguchi | ............ | F02N 11/0866 |
| 10,465,645 B2* | 11/2019 | Sierak | .................. | H02J 7/0036 |
| 10,626,837 B1* | 4/2020 | Vutetakis | ............ | F02N 11/0862 |
| 10,808,671 B2* | 10/2020 | Greene | ................ | F02N 11/106 |
| 10,830,826 B2* | 11/2020 | Karner | ................ | G08B 25/001 |
| 10,907,603 B2* | 2/2021 | Caballero Atienzar | ...................... | F02N 11/0862 |
| 10,921,381 B2* | 2/2021 | Karner | ................ | G01R 31/388 |
| 10,965,133 B2* | 3/2021 | Or | ........................ | H01M 50/572 |
| 10,992,149 B1* | 4/2021 | Kahn | .................... | H02J 7/0029 |
| 10,998,714 B2* | 5/2021 | Ishida | .................... | H02J 7/00 |
| 11,009,553 B2* | 5/2021 | Li | ........................ | H02J 7/0047 |
| 11,038,363 B2* | 6/2021 | Dulle | .................... | H01M 10/482 |
| 11,214,169 B2* | 1/2022 | Ono | ........................ | B60L 58/12 |
| 11,215,679 B2* | 1/2022 | Liu | ........................ | G01R 19/16542 |
| 2002/0145406 A1* | 10/2002 | Onishi | .................. | H02J 7/0029 320/134 |
| 2003/0011345 A1* | 1/2003 | Hanafusa | ............ | H01M 10/425 320/150 |
| 2003/0205937 A1* | 11/2003 | Koos | .................... | F02N 11/0862 307/10.6 |
| 2004/0109274 A1* | 6/2004 | Sato | .................... | H02J 7/00304 361/90 |
| 2005/0041345 A1* | 2/2005 | Koos | .................... | F02N 11/0862 361/23 |
| 2005/0236900 A1* | 10/2005 | Kahara | ................ | F02N 11/108 307/10.1 |
| 2005/0283304 A1* | 12/2005 | Endo | .................... | F02D 41/26 701/114 |
| 2006/0097577 A1* | 5/2006 | Kato | .................... | H02J 7/1423 307/10.1 |
| 2008/0111520 A1* | 5/2008 | Sasaki | .................. | H02J 7/0031 320/134 |
| 2008/0158755 A1* | 7/2008 | Sato | .................... | H02J 7/0031 361/87 |
| 2009/0237032 A1* | 9/2009 | Nam | .................. | H02J 7/0021 320/155 |
| 2009/0278509 A1* | 11/2009 | Boyles | .................. | H02J 7/1461 320/163 |
| 2010/0134934 A1* | 6/2010 | Matsubara | ............ | F02N 11/087 361/49 |
| 2010/0259856 A1* | 10/2010 | Senriuchi | ............... | H02H 3/066 361/49 |
| 2011/0204929 A1* | 8/2011 | Nakayama | ....... | H03K 17/08128 327/109 |
| 2012/0162847 A1* | 6/2012 | Suzuki | ................ | H01H 51/065 361/206 |
| 2012/0216768 A1* | 8/2012 | Nakamura | .......... | F02N 11/10 123/179.3 |
| 2012/0315518 A1* | 12/2012 | Langheim | ............ | H01M 50/50 429/61 |
| 2013/0057065 A1* | 3/2013 | Rinze | .................... | F02N 11/108 307/10.6 |
| 2013/0162030 A1* | 6/2013 | Sonesson | .................. | B60L 1/00 307/10.1 |
| 2013/0200699 A1* | 8/2013 | Origane | .................. | F02N 11/10 307/10.6 |
| 2013/0214595 A1* | 8/2013 | Sierak | .................... | B60R 16/03 307/10.6 |
| 2013/0325303 A1* | 12/2013 | Kiuchi | ............... | G01R 31/3648 324/426 |
| 2014/0035292 A1* | 2/2014 | Gronwald | ............ | B60R 16/03 290/38 R |
| 2014/0104739 A1 | 4/2014 | Nakamoto et al. | | |
| 2014/0335383 A1* | 11/2014 | Langheim | ............ | H01M 50/50 429/50 |
| 2015/0001858 A1* | 1/2015 | Sierak | .................. | H02J 7/0036 290/38 R |
| 2015/0028599 A1* | 1/2015 | Suzuki | .................. | F02N 11/087 290/38 C |
| 2015/0076899 A1* | 3/2015 | Tofilescu | ............ | H03K 17/0822 307/9.1 |
| 2015/0308398 A1* | 10/2015 | Nguyen | ................ | F02N 11/0825 903/930 |
| 2016/0094056 A1* | 3/2016 | Dulle | .................... | B60L 3/0046 320/126 |
| 2016/0160828 A1* | 6/2016 | Betscher | ................ | B60R 16/03 307/10.6 |
| 2016/0177907 A1* | 6/2016 | Betscher | ................ | F02N 11/087 307/10.6 |
| 2017/0094790 A1* | 3/2017 | Tazarine | ................ | F02N 11/087 |
| 2017/0197567 A1* | 7/2017 | Iwasaki | ................ | B60R 16/005 |
| 2017/0310150 A1 | 10/2017 | Mizuta | | |
| 2018/0015891 A1* | 1/2018 | Taniguchi | ............ | H02J 7/1461 |
| 2018/0030945 A1* | 2/2018 | Caballero Atienzar | ...................... | H02J 7/0068 |
| 2018/0043779 A1 | 2/2018 | Tajima | | |
| 2018/0175647 A1* | 6/2018 | Or | ........................ | H02J 7/0044 |
| 2018/0187642 A1* | 7/2018 | Sierak | .................. | H02J 7/0036 |
| 2018/0283341 A1* | 10/2018 | Greene | ................ | F02N 11/087 |
| 2018/0331544 A1* | 11/2018 | Dulle | .................... | B60L 3/04 |

(56) References Cited

U.S. PATENT DOCUMENTS

| | | | |
|---|---|---|---|
| 2019/0033395 A1* | 1/2019 | Karner | G01R 31/3647 |
| 2019/0033396 A1* | 1/2019 | Karner | G06F 3/0482 |
| 2019/0056457 A1* | 2/2019 | Li | G01R 31/396 |
| 2019/0207381 A1* | 7/2019 | Ishida | H01M 10/48 |
| 2019/0219640 A1* | 7/2019 | Liu | G01R 31/52 |
| 2019/0225109 A1* | 7/2019 | Ono | B60L 3/0015 |
| 2019/0237821 A1* | 8/2019 | Lo | H01M 10/6555 |
| 2020/0099216 A1* | 3/2020 | Chen | H02H 7/18 |
| 2020/0149504 A1* | 5/2020 | Vutetakis | H02H 9/02 |
| 2020/0381929 A1* | 12/2020 | Jin | H01M 50/572 |
| 2021/0050733 A1* | 2/2021 | Imanaka | H02J 7/0029 |
| 2021/0231738 A1* | 7/2021 | Li | H02J 7/0013 |
| 2021/0384560 A1* | 12/2021 | Li | B60L 58/10 |

FOREIGN PATENT DOCUMENTS

| | | | | |
|---|---|---|---|---|
| CA | 3119024 A1 | * | 5/2020 | F02N 11/0862 |
| CN | 111630746 A | * | 9/2020 | F02N 11/0848 |
| DE | 102005018363 B4 | * | 12/2017 | F02N 11/087 |
| DE | 102016215142 A1 | * | 2/2018 | F02N 11/087 |
| DE | 112019000649 T5 | * | 10/2020 | F02N 11/0848 |
| JP | H11-283677 A | | 10/1999 | |
| JP | 2005307851 A | * | 11/2005 | F02N 11/087 |
| JP | 2007-046546 A | | 2/2007 | |
| JP | 2007-218145 A | | 8/2007 | |
| JP | 2008-069644 A | | 3/2008 | |
| JP | 2008-125268 A | | 5/2008 | |
| JP | 2011111032 A | * | 6/2011 | F02N 11/08 |
| JP | 2012-077695 A | | 4/2012 | |
| JP | 2013-145175 A | | 7/2013 | |
| JP | 5292155 B2 | * | 9/2013 | H02H 3/066 |
| JP | 2013-209900 A | | 10/2013 | |
| JP | 2014-096975 A | | 5/2014 | |
| JP | 2016-224066 A | | 12/2016 | |
| JP | 2017-200272 A | | 11/2017 | |
| JP | 2018-026979 A | | 2/2018 | |
| JP | 2019134628 A | * | 8/2019 | F02N 11/0848 |
| KR | 101047831 B1 | * | 7/2011 | F02N 11/08 |
| WO | WO-2019150986 A1 | * | 8/2019 | F02N 11/0848 |
| WO | WO-2020096738 A1 | * | 5/2020 | F02N 11/0862 |

* cited by examiner

MANAGEMENT DEVICE, ENERGY STORAGE APPARATUS, AND MANAGEMENT METHOD FOR ENERGY STORAGE DEVICE

TECHNICAL FIELD

One aspect of the present invention relates to a technique for managing an energy storage device.

BACKGROUND ART

A battery mounted in a vehicle includes a management device in order to manage a state of an energy storage device. In Patent Document 1 below, the management device uses an energy storage device as a power source.

PRIOR ART DOCUMENT

Patent Document

Patent Document 1: JP-A-2017-200272

SUMMARY OF THE INVENTION

Problems to be Solved by the Invention

The battery for starting an engine may cause a short circuit between external terminals due to a carelessness of an operator at the time of installation work or replacement work on/from the vehicle. When an external short circuit occurs, a large current flows and the voltage of the energy storage device drops, so that the management device may lose power. When the power is lost, the management device cannot monitor the state of the energy storage device. Thus, when the external short circuit is resolved and the power is restored, it is desirable that the management device perform a response operation according to the occurrence of the external short circuit. The response operation includes, for example, a protection operation of the energy storage device, a notification operation of reporting an abnormality, and the like. However, since the cranking current is a large current, and hence, in the battery for starting the engine, not only at the time of the external short circuit, but also at the time of the engine start, the voltage of the energy storage device drops so that the management device may lose power. If the response operation is performed at the time of power loss due to the engine start, there is a problem that usability is reduced.

One aspect of the present invention is to maintain the usability while enhancing the safety of the energy storage device in such a manner that the cause of the power loss is determined, at the time of the external short circuit, the response operation according to the occurrence of the external short circuit is executed, and at the time of the engine start, the response operation is not executed.

Means for Solving the Problems

According to one aspect, there is provided a management device for an energy storage device, including a processing unit that manages the energy storage device, in which, when the management device for an energy storage device has lost power due to a voltage drop of the energy storage device, the processing unit determines whether cause of the power loss is an external short circuit between external terminals of the energy storage device or an engine start, and the processing unit executes a response operation according to occurrence of the external short circuit in a case of the external short circuit, and does not execute the response operation in a case of the engine start.

Advantages of the Invention

In this configuration, it is possible to maintain the usability while enhancing the safety of the energy storage device in such a manner that the cause of the power loss is determined, at the time of the external short circuit, the response operation is executed, and at the time of the engine start, the response operation is not executed.

MODE FOR CARRYING OUT THE INVENTION

Figure 1:
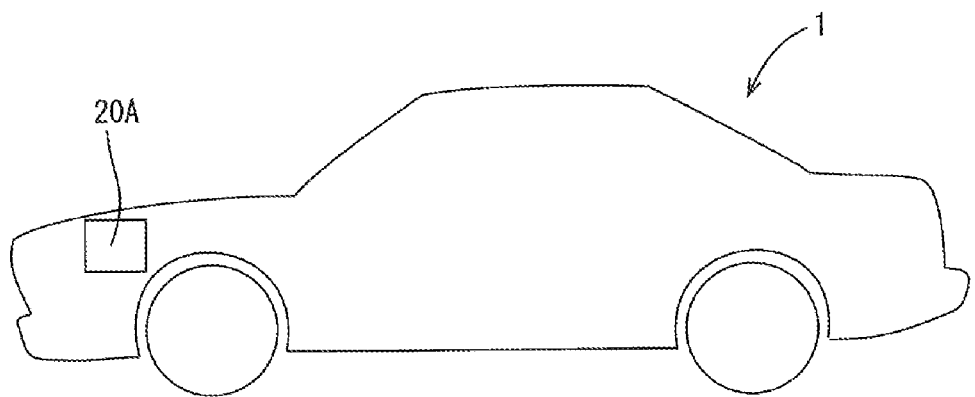
FIG. 1 is a side view of an automobile.

A management device for an energy storage device for starting an engine includes a processing unit that manages the energy storage device, in which, when the management device for an energy storage device has lost power due to a voltage drop of the energy storage device, the processing unit determines whether cause of the power loss is an external short circuit between external terminals of the energy storage device or an engine start, and the processing unit executes a response operation according to the occurrence of the external short circuit in the case of the external short circuit, and does not execute the response operation in the case of the engine start.

In this configuration, when the cause of the power loss is an external short circuit, the response operation according to the occurrence of the external short circuit is executed, and when the cause of the power loss is an engine start, the response operation is not executed. With this, it is possible to maintain the usability while enhancing the safety of the energy storage device.

The processing unit may determine whether the cause of the power loss is an external short circuit or an engine start based on whether or not communication with an electronic control unit mounted in a vehicle can be resumed after the power is restored.

When the power is lost, the processing unit may be supplied with power from an auxiliary power source and record a communication record with an electronic control unit mounted in the vehicle for a certain period around the time of power loss or measurement data of the energy storage device for the certain period in a non-volatile memory. After the power is restored, the processing unit may determine whether the cause of the power loss is an external short circuit or an engine start based on the communication record with the electronic control unit or the measurement data of the energy storage device stored in the memory. It is preferable that the measurement data include at least one of a current and a voltage of the energy storage device.

The external short circuit occurs at the time of installation work or replacement work of the energy storage apparatus on/from the vehicle. The installation work and the replacement work of the energy storage apparatus are performed in a state where a communication line is removed. Therefore, the external short circuit occurs in a state where communication with the vehicle is impossible. On the other hand, at the time of an engine start, the energy storage apparatus is mounted in the vehicle and the communication line is connected. Therefore, if the power is maintained, the management device can communicate with the vehicle. Therefore, it is possible to determine whether the cause of the power loss is an "external short circuit" or an "engine start" based on the communication between the management device and the electronic control unit at the time of power restoration or at the time of power loss. Since the measurement data such as the voltage and the current of the energy storage device at the time of power loss differs due to the difference in the cause of the power loss, it is possible to make the determination based on the measurement data.

It is preferable that the processing unit determine whether the cause of the power loss is an external short circuit or an engine start based on a power loss time during which the management device loses power. When the cause of the power loss is an "engine start", the power loss time is a short time of about several hundred milliseconds. On the other hand, in the case of an "external short circuit", the power loss time is several seconds or more, which is a sufficiently long time as compared with the case of an "engine start". From the above, it is possible to determine whether the cause of the power loss is an "external short circuit" or an "engine start" based on the power loss time.

The processing unit may determine whether the cause of the power loss is an external short circuit or an engine start based on the measurement data of the energy storage device after the power is restored. It is preferable that the measurement data include at least one of a current and a voltage of the energy storage device. At the time of an engine start, an inrush current first flows from the energy storage device to a starter motor, and then an overcurrent flows each time a crankshaft makes one rotation. The overcurrent decreases as the crankshaft rotates. Therefore, the voltage waveform of the energy storage device is a waveform in which the voltage instantaneously greatly drops by the inrush current, and then the voltage drop amount attenuates stepwise. On the other hand, in the case of an external short circuit, a constant short-circuit current flows from the time of occurrence to the time of resolving, so that the voltage waveform of the energy storage device is rectangular. As described above, the voltage waveform differs between the "time of an engine start" and the "time of an external short circuit", and a current waveform also differs for the same reason. Therefore, it is possible to determine whether the cause of the power loss is an "external short circuit" or an "engine start" based on the measured data such as the voltage and current of the energy storage device after the power is restored.

A first area in which power loss is expected to occur due to an engine start may be defined by at least one of SOC and temperature of the energy storage device, and the processing unit may interrupt a current of the energy storage device when the energy storage device is included in the first area. By interrupting the current in the first area, there is almost no possibility of power loss due to an engine start. Therefore, when the power loss of the management device occurs in a region other than the first area, it can be determined that the cause is something other than the engine start, that is, an "external short circuit".

The response operation may include a protection operation for the energy storage device or a notification operation of reporting an abnormality. The energy storage device can be protected by the protection operation, and the abnormality can be reported to the outside by the notification operation.

First Embodiment

1. Description of Battery

Figure 2:
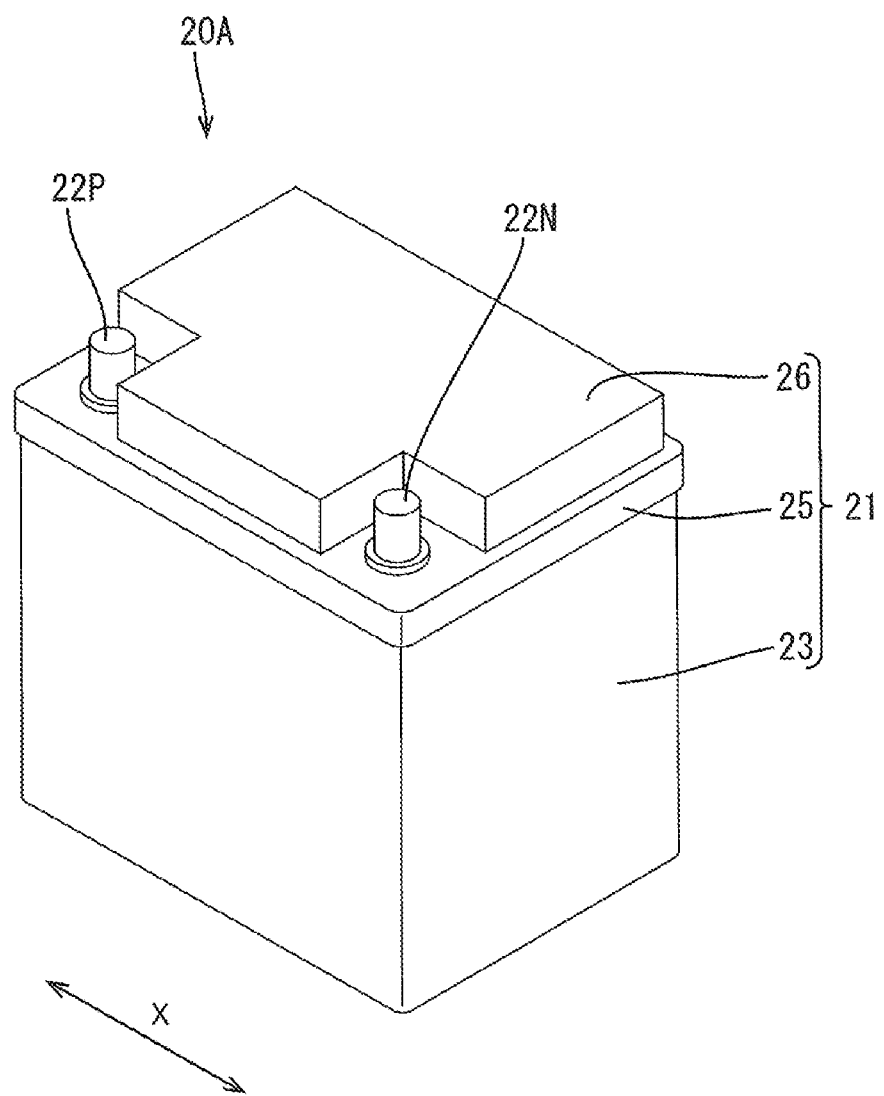
FIG. 2 is a perspective view of a battery.
Figure 3:
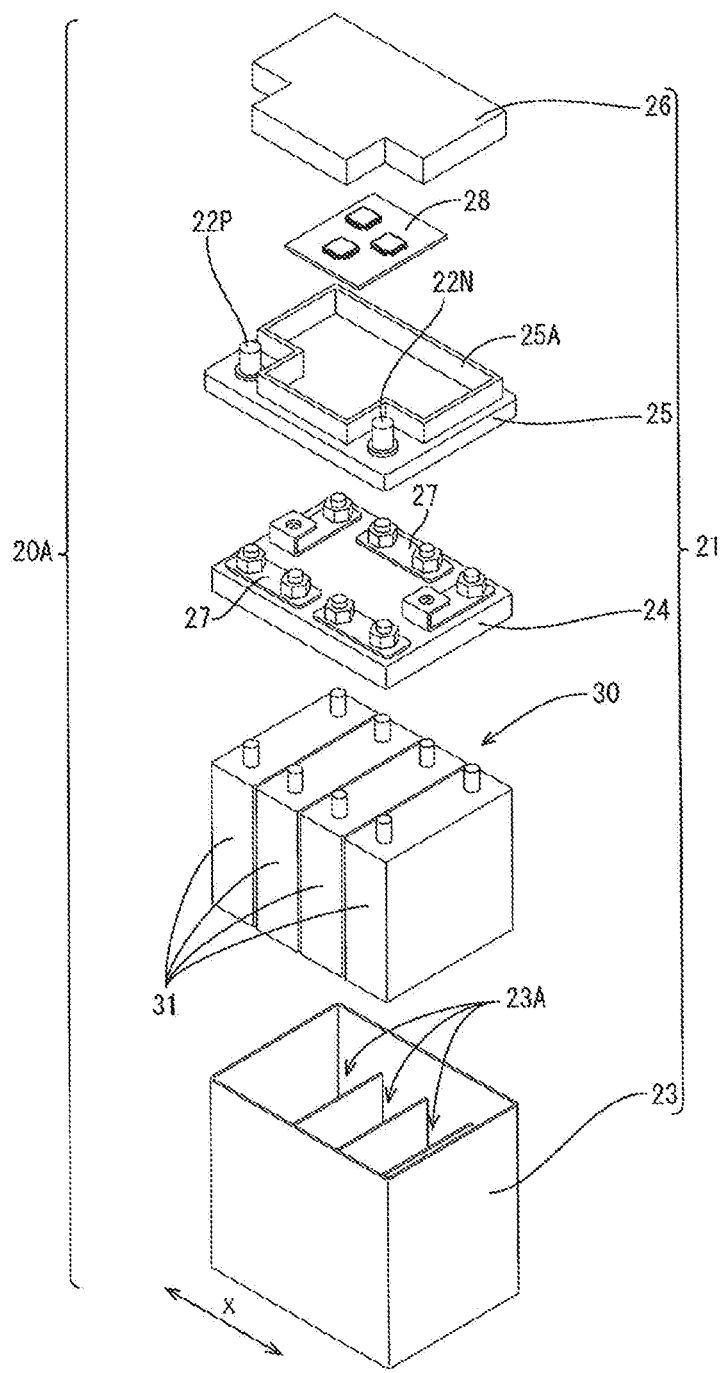
FIG. 3 is an exploded perspective view of the battery.
Figure 4:
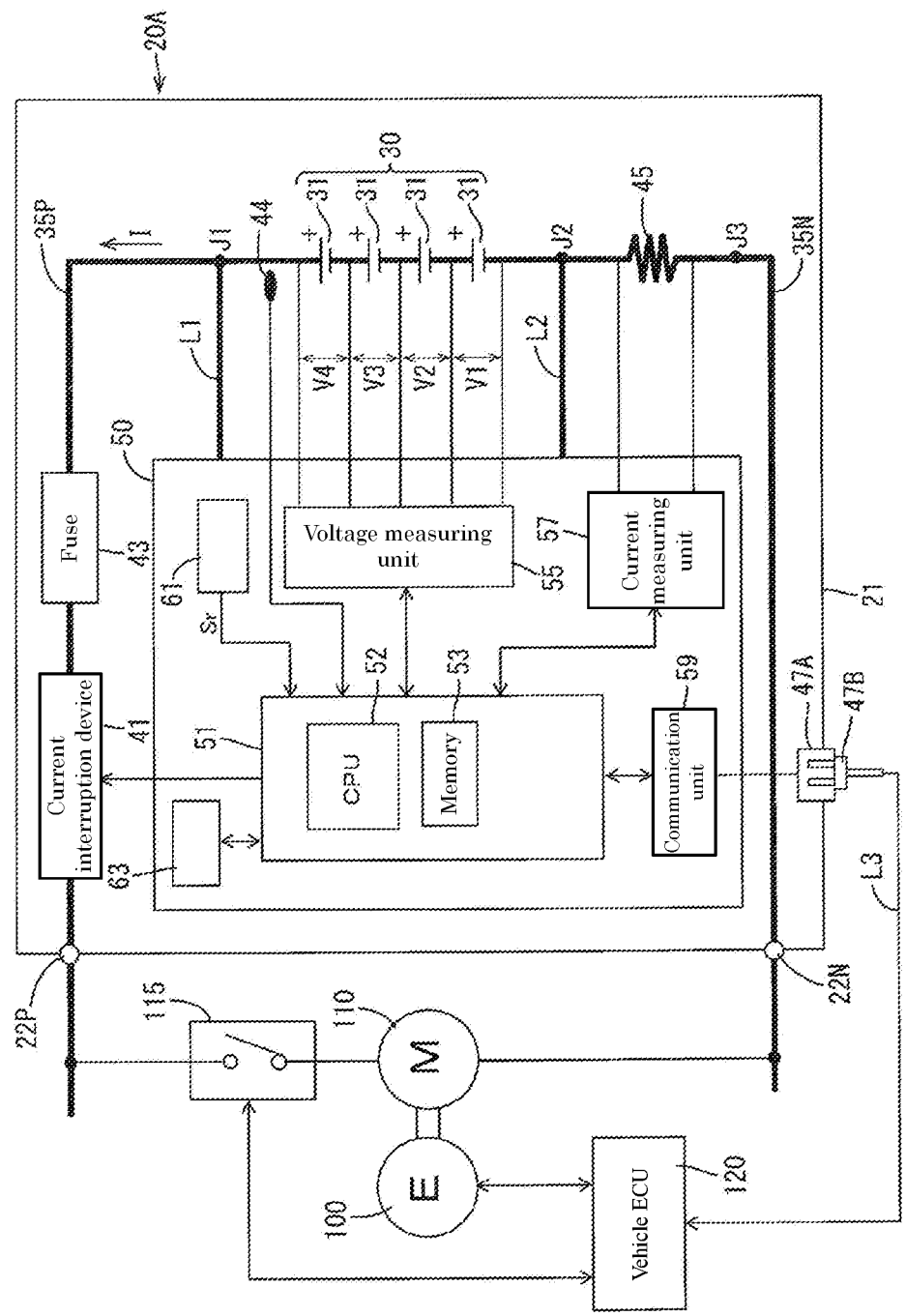
FIG. 4 is a block diagram showing an electrical configuration of the battery.

FIG. 1 is a side view of an automobile, FIG. 2 is a perspective view of a battery, FIG. 3 is an exploded perspective view of the battery, and FIG. 4 is a block diagram showing an electric configuration of the battery. In FIG. 1, only an automobile 1 and a battery 20A are shown, and other components constituting the automobile are omitted. The batteries 20A to 20D are examples of the "energy storage apparatus" in the present invention.

The automobile (an example of a vehicle) 1 includes the battery 20A, which is an energy storage apparatus, as shown in FIG. 1. As shown in FIG. 2, the battery 20A includes a block-shaped battery case 21, and in the battery case 21, an assembled battery 30 including a plurality of secondary batteries 31, and a circuit board 28 are accommodated. In the following description, in a case of referring to FIG. 2 and FIG. 3, the vertical direction of the battery case 21 when the battery case 21 is placed horizontally without tilting with respect to the installation surface is referred to as the height direction, and the direction along the long side direction of the battery case 21 is referred to as the width direction (X direction).

As shown in FIG. 3, the battery case 21 includes a box-shaped case main body 23 that opens upward, a positioning member 24 that positions the plurality of secondary batteries 31, an inner lid 25 that is mounted to an upper portion of the case main body 23, and an upper lid 26 that is mounted to an upper portion of the inner lid 25. In the case main body 23, a plurality of cell chambers 23A in which the secondary batteries 31 are individually accommodated are provided side by side in the X direction.

As shown in FIG. 3, a plurality of bus bars 27 are arranged on the upper surface of the positioning member 24, and the positioning member 24 is arranged above the plurality of secondary batteries 31 arranged in the case main body 23. Thus, the plurality of secondary batteries 31 are positioned and connected in series by the plurality of bus bars 27.

The inner lid 25 has a substantially rectangular shape in a plan view as shown in FIG. 3, and a pair of external terminals 22P and 22N are provided at both ends in the X direction. The pair of external terminals 22P and 22N are made of, for example, metal such as a lead alloy. The external terminal 22P is a positive electrode external terminal, and the external terminal 22N is a negative electrode external terminal.

As shown in FIG. 3, the circuit board 28 is arranged on the upper surface of the inner lid 25, and the inner lid 25 is closed by the upper lid 26 from above.

The electrical configuration of the battery 20A will be described with reference to FIG. 4. The battery 20A includes the assembled battery 30, a current interruption device 41, a fuse 43, a temperature sensor 44, a shunt resistor 45, and a management device 50.

The assembled battery 30 includes the plurality of secondary batteries 31 connected in series. The current interruption device 41, the fuse 43, the assembled battery 30, and the shunt resistor 45 are connected in series via energization paths 35P and 35N. The current interruption device 41 and the fuse 43 are arranged on the positive electrode side, and the shunt resistor 45 is arranged on the negative electrode side. The current interruption device 41 is connected to the positive electrode external terminal 22P via the energization path 35P, and the shunt resistor 45 is connected to the negative electrode external terminal 22N via the energization path 35N.

The current interruption device 41 and the fuse 43 are arranged on the circuit board 28. The current interruption device 41 is a semiconductor switch such as a relay or FET, and can interrupt the current by opening the energization path 35 for the secondary batteries 31. The fuse 43 melts and interrupts the current when a current exceeding the limit value flows for a specified time. The temperature sensor 44 detects the temperature of the assembled battery 30. The temperature sensor 44 is connected to the processing unit 51 via a signal line, and the temperature data of the assembled battery 30 is input to the processing unit.

The management device 50 is arranged on the circuit board 28. The management device 50 includes the processing unit 51, a voltage measuring unit 55, a current measuring unit 57, a communication unit 59, a reset circuit 61, and a display unit 63. A power line L1 on the positive side of the management device 50 is connected to a connection point J1 on the positive electrode side of the assembled battery 30, and a power line L2 on the negative electrode side is connected to a connection point J2 on the negative electrode side. The management device 50 uses the assembled battery 30 as a power source.

The processing unit 51 includes a CPU (central processing unit) 52 and a non-volatile memory 53. The processing unit 51 manages the assembled battery 30. Management of the assembled battery 30 includes monitoring of the state of the assembled battery 30 and execution of a response operation according to the occurrence of an external short circuit.

The monitoring of the state of the assembled battery 30 is performed based on the measurement data of the assembled battery 30 (that is, the data of the total voltage Vs of the assembled battery 30 measured by the voltage measuring unit 55, the data of the voltages V1 to V4 of the respective secondary batteries 31, the data of the current I measured by the current measuring unit 57, and the data of the temperature detected by the temperature sensor 44). Specifically, the monitoring of the state includes a process of monitoring whether or not the total voltage Vs of the assembled battery 30 and the battery voltages V1 to V4 of the respective secondary batteries 31 are within the use ranges, a process of monitoring whether or not the current is within the limit value, a process of monitoring whether or not the temperature is normal, and the like.

Further, the monitoring of the state of the assembled battery 30 includes estimation of SOC (state of charge). The CPU 52 performs a process of estimating SOC of the battery 20 based on the integral value of the current I measured by the current measuring unit 57 with respect to time, as shown in the following equations (1) and (2). The sign of the current is positive at the time of charging and negative at the time of discharging. As the monitoring of the state of the assembled battery 30, at least only one of the total voltage Vs of the assembled battery 30, the voltages V1 to V4 of the respective secondary batteries, the current I, the temperature, and SOC may be monitored.

$$SOC = Cr/Co \times 100 \tag{1}$$

Co is the full charge capacity of the secondary battery, and Cr is the residual capacity of the secondary battery.

$$SOC = SOCo + 100 \times \int I dt / Co \tag{2}$$

SOCo is the initial value of SOC, and I is the current.

The voltage measuring unit 55 is a measurement IC and detects the voltages V1 to V4 of the respective secondary batteries 31 and the total voltage Vs of the assembled battery 30. The voltage measuring unit 55 converts the detected voltage data from an analog value into a digital value and outputs it to the processing unit 51.

$$Vs = V1 + V2 + V3 + V4 \qquad \text{Equation (3)}$$

The current measuring unit 57 is a measurement IC, and includes a PGA (programmable gain amplifier), an ADC (AD converter), and the like. The current measuring unit 57 detects the voltage between both ends of the shunt resistor 45. The current measuring unit 57 converts the detected voltage data from an analog value into a digital value and outputs it to the processing unit 51. Since the voltage between both ends of the shunt resistor 45 is proportional to the magnitude of the current I, the current I can be measured.

As shown in FIG. 4, a starter motor 110 is connected to the external terminals 22P and 22N of the battery 20A via an ignition switch 115. The starter motor 110 is a starting device for an engine 100 mounted in a vehicle 1. When the ignition switch 115 is turned on, a current flows from the battery 20A to the starter motor 110, and the starter motor 110 rotates. As a result, a crankshaft is rotated and the engine 100 is started. A vehicle ECU (Electronic Control Unit) 120 is mounted in the vehicle 1 and monitors the operating state of the engine 100, the state of the ignition switch 115, and the like.

As shown in FIG. 4, the battery case 21 is provided with a communication connector connecting portion 47A. By connecting a communication connector 47B to the communication connector connecting portion 47A, the management device 50 is communicably connected to the vehicle ECU 120 via a communication line (Lin bus) L3. The management device 50 can receive the information on the operating state of the engine 100 and the operating state of the ignition switch 115 from the vehicle ECU 120 by communication via the communication line L3.

2. Response Operation According to Power Loss of Management Device 50 and Occurrence of External Short Circuit The battery 20A for starting the engine is frequently replaced. Therefore, at the time of installation work or replacement work on/from the vehicle 1, the external terminals 22P and 22N may be externally short-circuited with a tool or the like.

When the discharge current flows in the assembled battery 30, the total voltage Vs drops due to the voltage drop due to the internal resistance. When an external short circuit occurs, a large current is discharged, so that the total voltage Vs of the assembled battery 30 greatly drops, and the management device 50 may lose power. Specifically, when the total voltage Vs of the assembled battery 30 becomes lower than the operable voltage Vmin1 of the management device 50 (Vs<Vmin1), the power is lost.

The operable voltage Vmin1 is the minimum operating voltage required to operate the management device 50, and is 5V as an example.

When the power is lost, the management device 50 cannot monitor the state of the assembled battery 30. Thus, when the external short circuit is resolved and the power is restored, it is desirable that the management device 50 perform a response operation according to the occurrence of the external short circuit. The response operation includes, for example, a protection operation for the assembled battery 30, a notification operation of reporting an abnormality to the outside, and the like. As the response operation, either one of the protection operation and the notification operation may be executed, or both may be executed.

A large cranking current instantaneously flows through the battery 20A for starting the engine at the time of an engine start. Therefore, when certain conditions are met, such as when SOC of the assembled battery 30 is low, the total voltage Vs of the assembled battery 30 drops not only at the external short circuit but also at the time of an engine start, and the management device 50 may lose power. At the time of an engine start, it is possible to roughly predict how much and how long the current has flowed through the battery 20A. If the above-described response operation is performed at the time of power loss due to the engine start, there is a problem that usability is reduced.

Therefore, when the power is lost, the management device 50 determines whether the cause of the power loss is an "external short circuit" or an "engine start". In the case of the "external short circuit", the response operation according to the occurrence of the external short circuit is executed, and in the case of the "engine start", the response operation is not executed.

Figure 5:
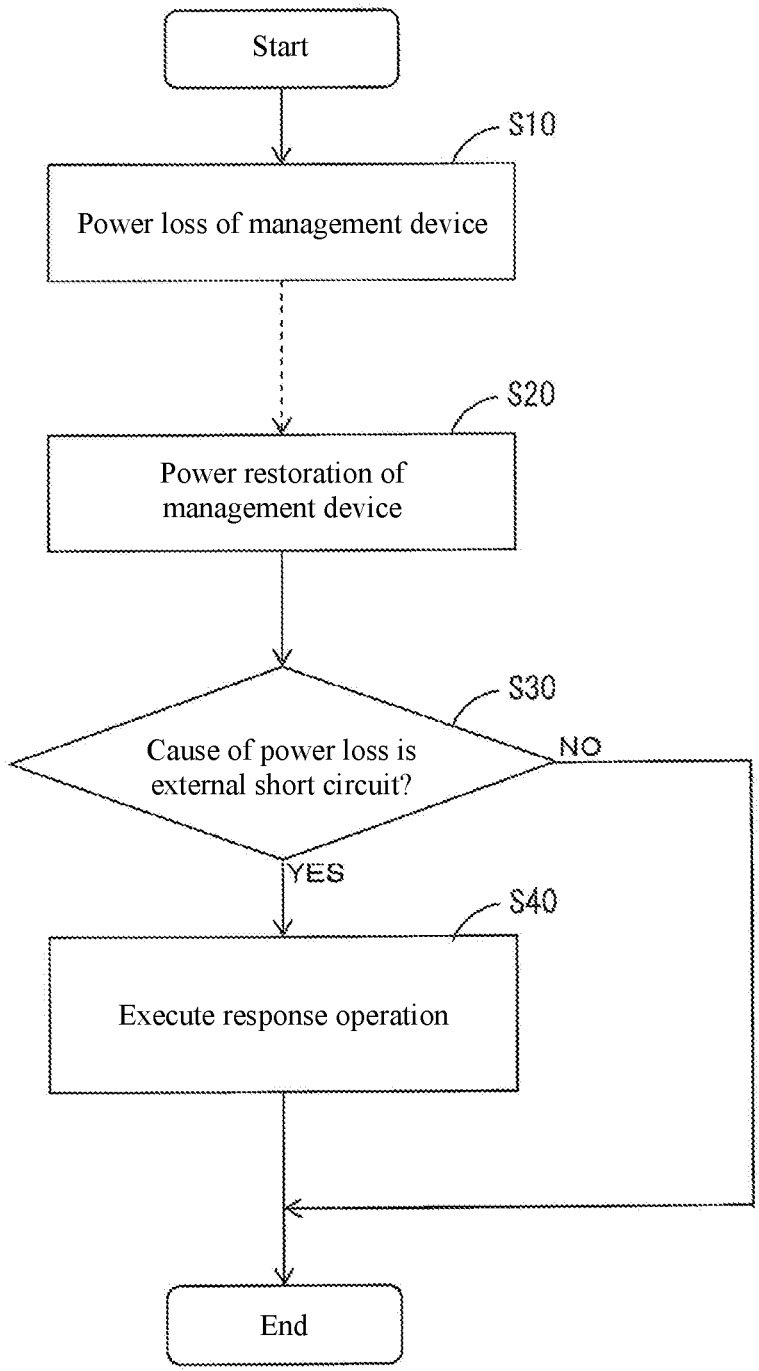
FIG. 5 is a flowchart showing a flow from power loss to response operation execution.

FIG. 5 is a flowchart showing an operation procedure from the power loss to the execution of the response operation. When a large current flows due to the external short circuit or engine start and the total voltage Vs of the assembled battery 30 becomes lower than the operable voltage Vmin1 of the management device 50, the management device 50 loses power (S10).

When the external short circuit is resolved or the start of the engine 100 is completed, the battery 20 returns to the state before the large current flows, and the total voltage Vs of the assembled battery 30 increases. When the total voltage Vs of the assembled battery 30 becomes higher than the operable voltage Vmin1 of the management device 50 (Vs>Vmin1), the management device 50 restores power (S20).

Figure 6:
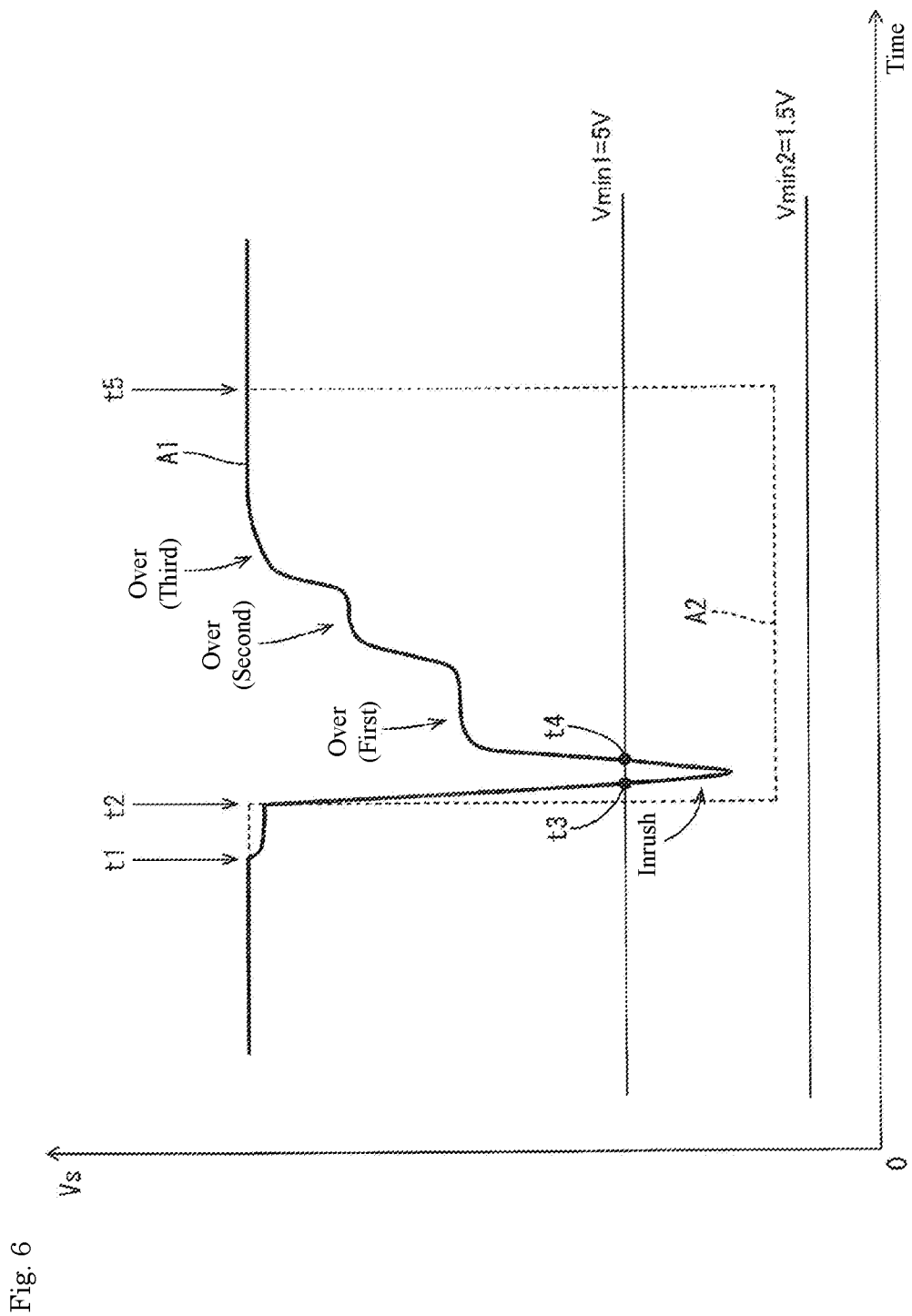
FIG. 6 is a graph showing changes in a total voltage of an assembled battery at the time of an engine start and the time of an external short circuit.

FIG. 6 is a graph showing the total voltage Vs of the assembled battery 30. A solid line A1 indicates a change in the total voltage Vs at the time of an engine start, and a broken line A2 indicates a change in the total voltage Vs at the time of the external short circuit.

Time t1 is the on-timing of the ignition switch 115. When the ignition switch 115 is turned on, a cranking current flows from the battery 20 to the starter motor 110 after time t2. At the beginning of the current flow, a rush current flows into the starter motor 110, so that a large current flows instantaneously. Therefore, at time t3, the total voltage Vs becomes lower than the operable voltage Vmin1 and the power is lost. After that, at time t4, the total voltage Vs becomes larger than the operable voltage Vmin1 and the power is restored.

In the case of the external short circuit, a constant large current flows as soon as the short circuit occurs. Therefore, at about the same time t1 as the occurrence of the external short circuit, the total voltage Vs becomes lower than the operable voltage Vmin1 and the power is lost. After that, during the external short circuit, the voltage continues to drop, and when the external short circuit is resolved, the total voltage Vs becomes larger than the operable voltage Vmin1 at about the same time t5 as the resolving, and the power is restored.

When the power is restored at time t4 or time t5, the reset signal Sr is output from the reset circuit 61, and the processing unit 51 is activated. After that, the CPU 52 executes a process of determining the cause of the power loss (S30).

The external short circuit occurs at the time of installation work or replacement work of the battery 20A on/from the vehicle 1. The installation work and the replacement work of the battery 20A are performed in a state where the communication line L3 is removed. Therefore, the external short circuit occurs in a state where communication with the vehicle ECU 120 is impossible. On the other hand, at the time of an engine start, the battery 20A is mounted in the vehicle 1 and the communication line L3 is connected. Therefore, if the power is maintained, the management device 50 can communicate with the vehicle ECU 120.

Therefore, if communication with the vehicle ECU 120 cannot be resumed within a predetermined period after the power is lost, it can be determined that the cause of the power loss is an "external short circuit". Further, when the communication with the vehicle ECU 120 can be resumed, it can be determined that the cause of the power loss is an "engine start".

When the cause of the power loss is an "external short circuit", the CPU 52 executes a response operation according to the occurrence of the external short circuit (S40). Specifically, the CPU 52 performs, as a response operation, a protection operation for the assembled battery 30 (current interruption by the current interruption device 41), a notification operation of reporting an abnormality (warning display on the display unit 63), and the like.

On the other hand, when the cause of the power loss is an "engine start", the CPU 52 does not execute the response operation. With the above, the processing after the power is restored is completed.

3. Description of Effect

In this configuration, when the cause of the power loss is an external short circuit, the response operation according to the occurrence of the external short circuit is executed, and when the cause of the power loss is an engine start, the response operation is not executed. With this, it is possible to maintain the usability while enhancing the safety of the battery 20A.

Second Embodiment

Figure 7:
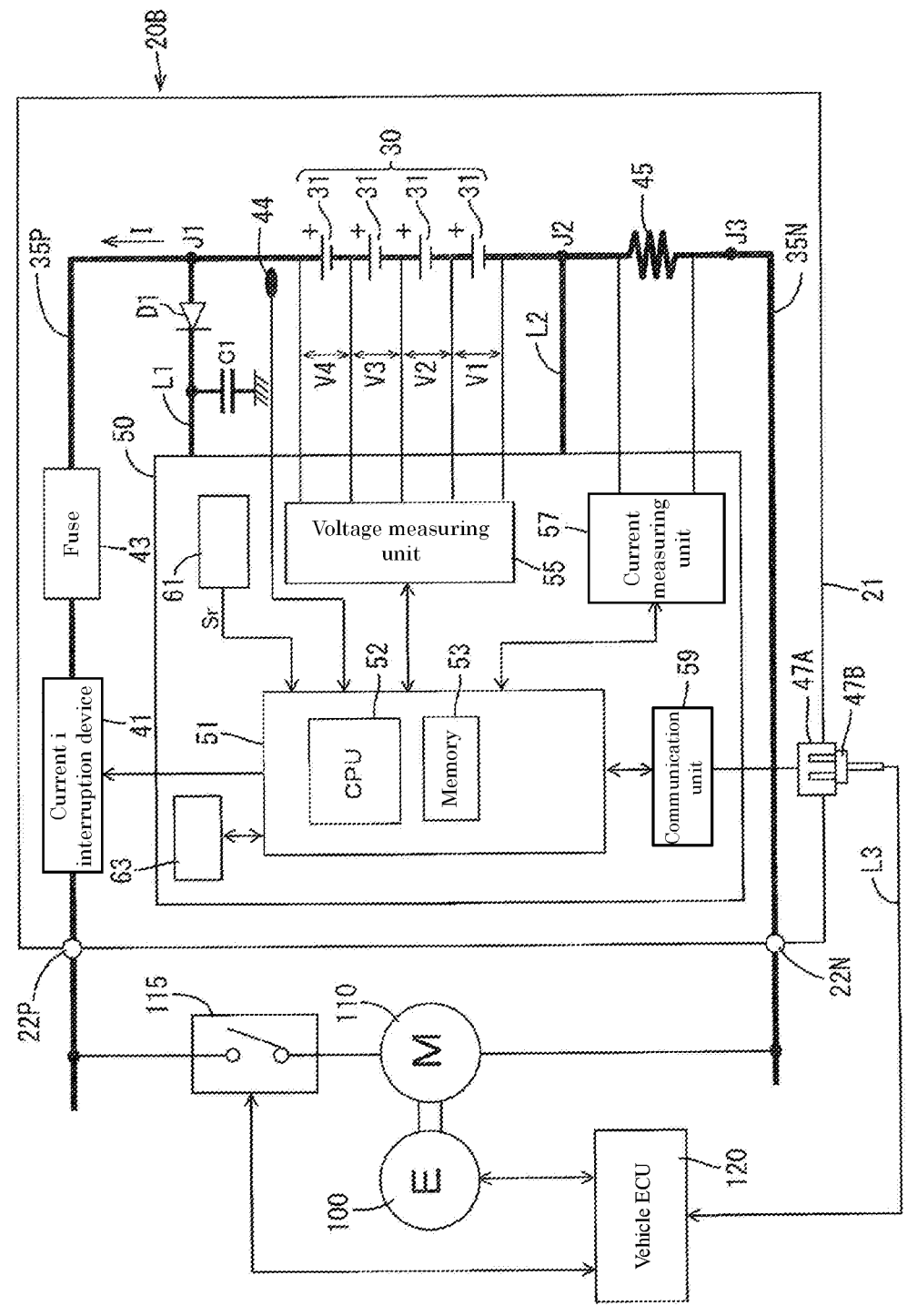
FIG. 7 is a block diagram showing an electrical configuration of a battery.

FIG. 7 is a block diagram showing an electrical configuration of the battery 20B. The battery 20B shown in FIG. 7 is different from the battery 20A shown in FIG. 4 in that a capacitor C1 and a diode D1 are added to the power line L1 of the management device 50. The capacitor C1 is an auxiliary power source at the time of power loss, and supplies power to the management device 50 for a predetermined period after the power is lost. The diode D1 discharges from the assembled battery 30 to the capacitor C1 in the forward direction, and prevents backflow from the capacitor C1 to the assembled battery 30.

In the battery 20B of the second embodiment, the processing unit 51 performs a process of monitoring the total voltage Vs of the assembled battery 30 based on the output of the voltage measuring unit 55. When a user turns on the ignition switch 115 (time t1 in FIG. 8), a cranking current flows from the battery 20B to the starter motor 110. As a result, the starter motor 110 is driven and the engine 100 is started.

After the operation of the ignition switch 115, the operation information of the ignition switch 115 and the start information of the engine 100 are transmitted from the vehicle ECU 120 to the management device 50 of the battery 20B by communication via the communication line (Lin bus) L3.

Figure 8:
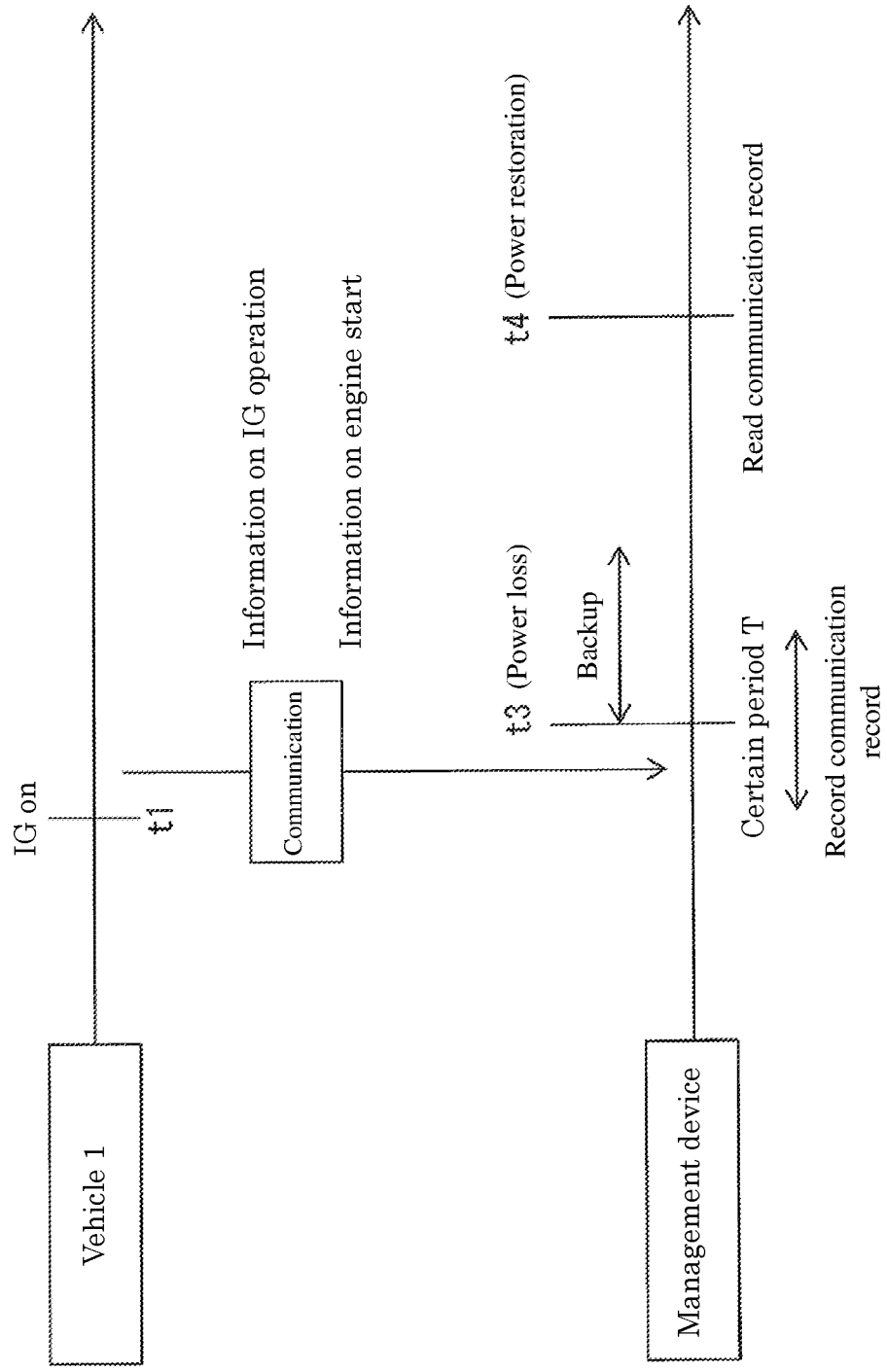
FIG. 8 is a diagram showing contents of communication performed between a vehicle and a management device.

On the other hand, when the total voltage Vs of the assembled battery 30 becomes lower than the operable voltage Vmin1 of the management device 50 due to the cranking current accompanying the engine start, the management device 50 detects the power loss from the measurement data of the voltage measuring unit 55 (the voltage lower than the operable voltage Vmin is measured) (time t3 in FIG. 8). After the power is lost, the management device 50 can operate for a predetermined period by using the capacitor C1 as an auxiliary power source.

When the management device 50 detects the power loss, the management device 50 records the communication record received from the vehicle ECU 120 in the non-volatile memory 53 for a certain period T around the time of power loss. Therefore, in this case, the communication record concerning the operation information of the ignition switch 115 and the start information of the engine 100 is recorded in the memory 53. It is preferable that the certain period T around the time of power loss be determined so as to include at least the time from the ignition on to the power loss (t1 to t3 in FIGS. 6 and 8).

When the capacitor C1 can no longer maintain the operable voltage Vmin1, the management device 50 is completely in a power loss state and stops.

When the start of the engine is completed, the state before the cranking current flows is restored, and hence the total voltage Vs of the assembled battery 30 increases. When the total voltage Vs of the assembled battery 30 becomes larger than the operable voltage Vmin1, the power of the management device 50 is restored (time t4 in FIG. 8).

When the power is restored, the reset signal Sr is output from the reset circuit 61, and the processing unit 51 is activated. After that, the processing unit 51 accesses the memory 53 and reads the communication record received for the certain period T at the time of power loss.

When there is a communication record received for the certain period T at the time of power loss, the processing unit 51 determines that the cause of the power loss is an "engine start". On the other hand, if there is no communication record received for the certain period T at the time of power loss, it is considered that the power loss occurs in the state where the battery 20 is removed from the vehicle 1, and hence it is determined that the cause of the power loss is an "external short circuit".

As described above, the battery 20B is different from the battery 20A of the first embodiment in the method of determining the cause of the power loss, and determines whether the cause of the power loss is an "external short circuit" or an "engine start" based on whether or not there is a communication record at the time of power loss.

The processing unit 51 does not execute the response operation according to the occurrence of the external short circuit if the cause of the power loss is an "engine start", and the processing unit 51 executes the response operation only if the cause of the power loss is an "external short circuit". With this, it is possible to maintain the usability while enhancing the safety of the battery 20B.

Third Embodiment

Figure 9:
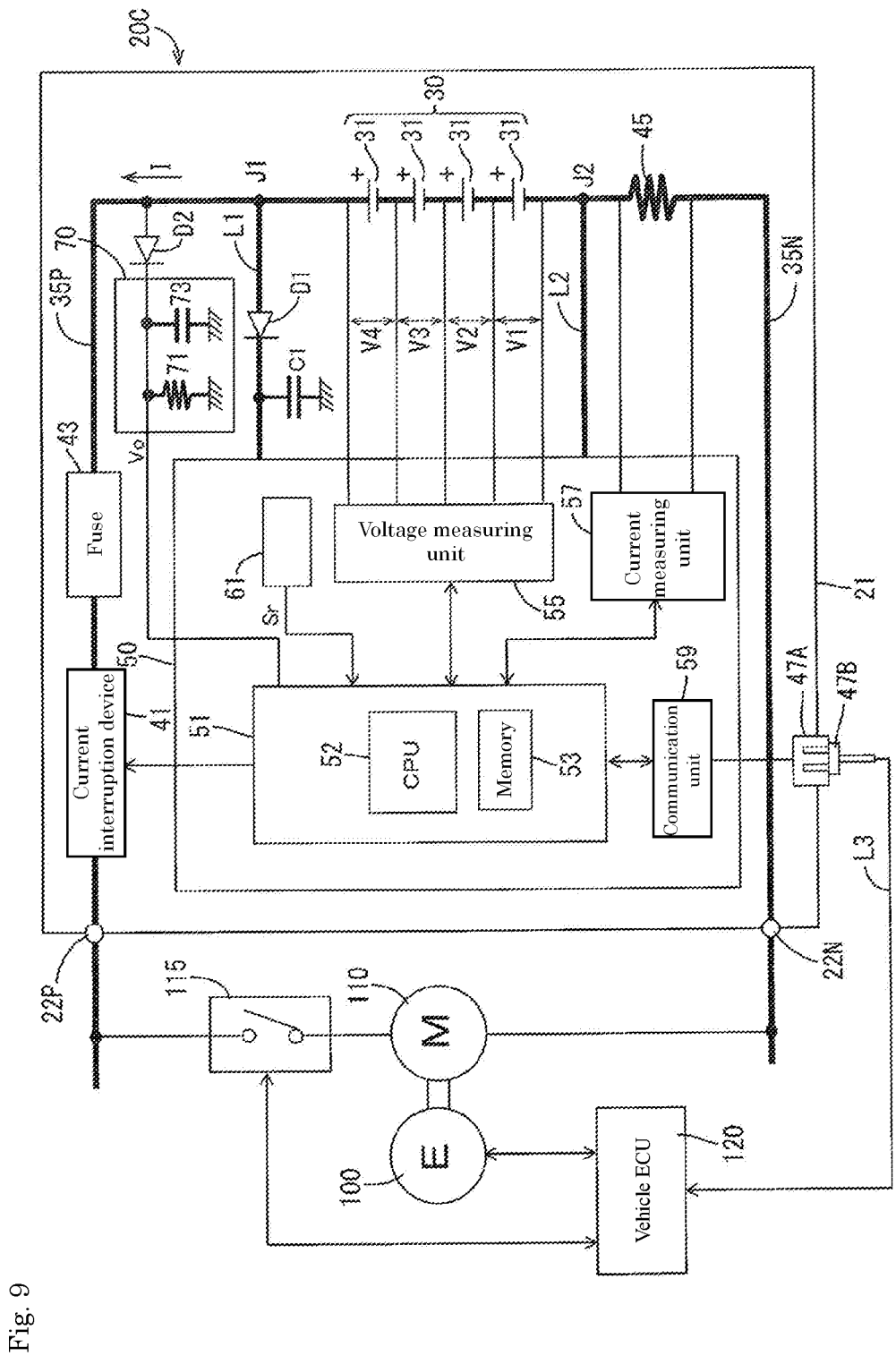
FIG. 9 is a block diagram showing the electrical configuration of a battery.

FIG. 9 is a block diagram showing an electrical configuration of the battery 20C. The battery 20C is different from the battery 20B of the second embodiment in that a timer circuit 70 and a diode D2 are added. The timer circuit 70 is connected to the positive electrode of the assembled battery 30 via the diode D2. The diode D2 discharges from the assembled battery 30 to the timer circuit 70 in the forward direction, and prevents backflow from the timer circuit 70 to the assembled battery 30. In FIG. 9, the temperature sensor 44 and the display unit 63 are omitted.

The timer circuit 70 is connected to the processing unit 51 via a signal line, and the output voltage Vo of the timer circuit 70 is input to the processing unit 51.

The timer circuit 70 is a CR discharge circuit including a resistor 71 and a capacitor 73, and discharges the electric charge charged in the capacitor 73 from the assembled battery 30 by the resistor 71 after the power is lost.

Figure 10:
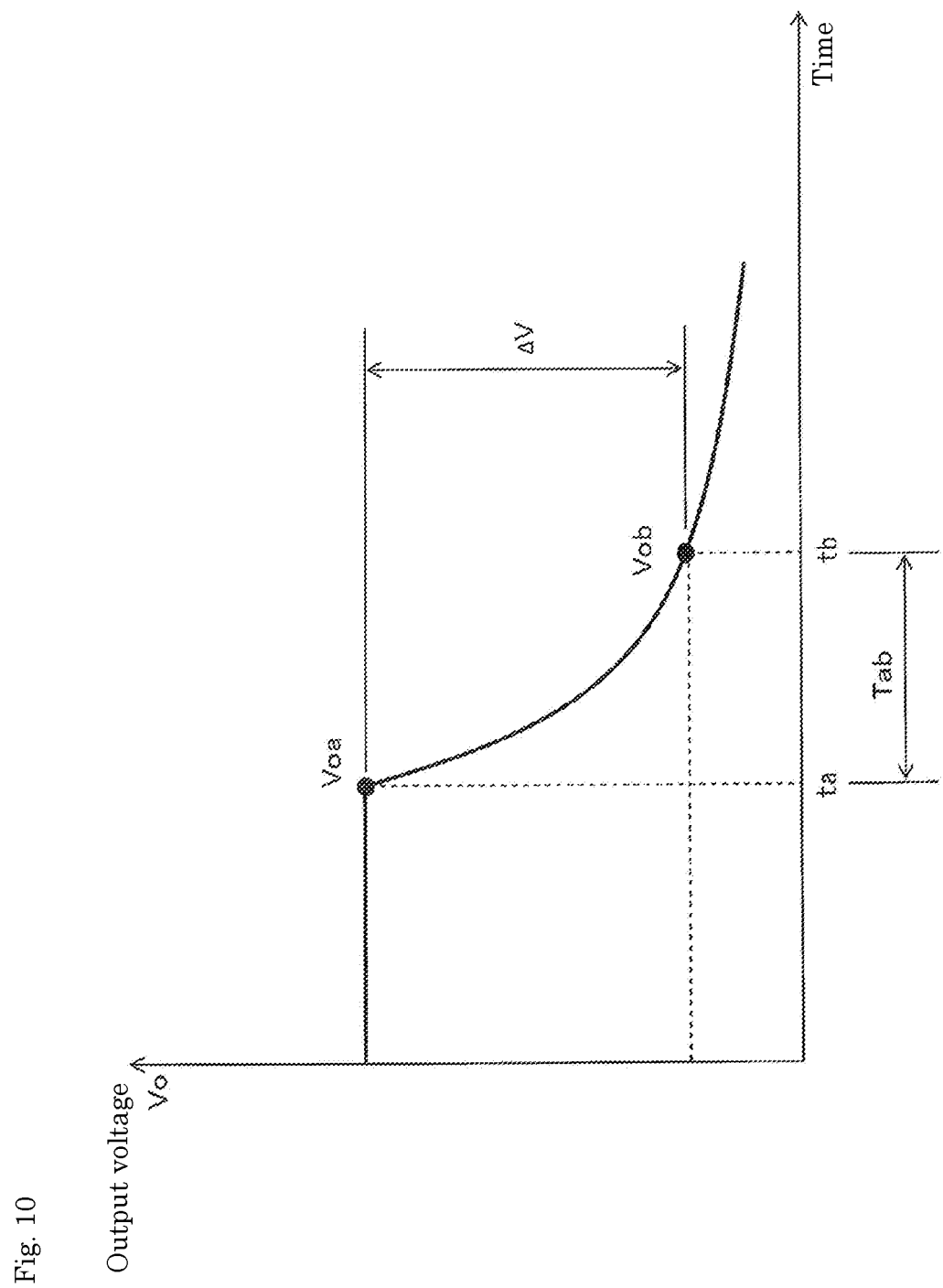
FIG. 10 is a graph showing changes in a output voltage of a timer circuit after power is lost.

As shown in FIG. 10, the voltage difference $\Delta V$ between the output voltage Voa of the timer circuit 70 at the time ta of power loss and the output voltage Vob of the timer circuit 70 at the time tb of power restoration depends on the time between the time ta of power loss and the time tb of power restoration (hereinafter, power loss time Tab). That is, the voltage difference $\Delta V$ increases as the power loss time Tab increases, and is uniquely determined by the power loss time Tab and the time constant of the CR timer.

$$\text{Voltage difference} \Delta V = Voa - Vob \qquad \text{Equation (1)}$$

Voa is the output voltage of the timer circuit 70 at the time to of power loss, and Vob is the output voltage of the timer circuit 70 at the time tb of power restoration.

Figure 11:
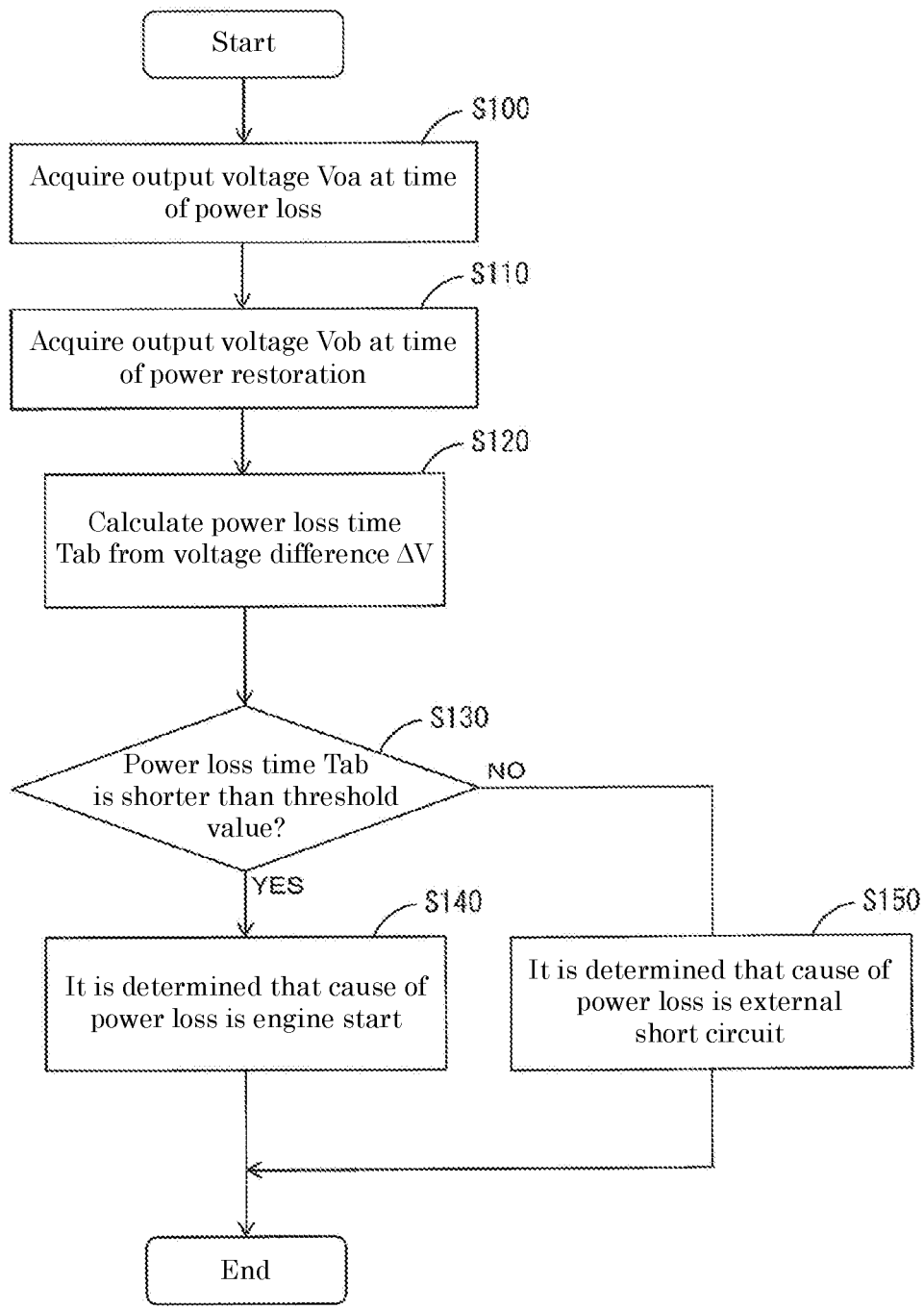
FIG. 11 is a flowchart showing a flow of processing of determining the cause after the power is lost.

FIG. 11 is a flowchart of a process for determining the factor of the power loss.

The processing unit 51 performs a process of measuring the output voltage Vo of the timer circuit 70 at both the time ta of power loss and the time tb of power restoration (S100, S110).

The time ta of power loss is a time point at which the total voltage Vs of the assembled battery 30 becomes lower than the operable voltage Vmin1, is time t3 in the case of an engine start indicated by the solid line A1 in FIG. 6, and is time t2 in the case of an external short circuit indicated by the broken line A2. The time tb of power restoration is a time point at which the total voltage Vs of the assembled battery 30 becomes higher than the operable voltage Vmin1, is time t4 in the case of an engine start indicated by the solid line A1 in FIG. 6, and is time t5 in the case of an external short circuit indicated by the broken line A2.

Next, the processing unit 51 calculates the voltage difference $\Delta V$ of the timer circuit 70 at the time to of power loss and the time tb of power restoration, and further calculates the power loss time Tab from the voltage difference $\Delta V$ (S120). The power loss time Tab is times t3 to t4 in the case of an engine start indicated by the solid line A1 in FIG. 6, and is times t2 to t5 in the case of an external short circuit indicated by the broken line A2 in FIG. 6.

When the cause of the power loss is an "engine start", the power loss time Tab is a short time of about several hundred milliseconds. On the other hand, in the case of an "external short circuit", the power loss time Tab is several seconds or more, which is a sufficiently long time as compared with the case of an "engine start".

Therefore, by comparing the power loss time Tab with the threshold value in the processing unit 51, it is possible to determine whether the cause of the power loss is an "engine start" or an "external short circuit". When the power loss time Tab is shorter than the threshold value, it can be determined that the cause of the power loss is an "engine start". On the other hand, when the power loss time Tab is longer than the threshold value, it can be determined that the cause of the power loss is an "external short circuit" (S130 to S150).

The processing unit 51 does not execute the response operation according to the external short circuit if the cause of the power loss is an "engine start", and the processing unit 51 executes the response operation only if the cause of the power loss is an "external short circuit". With this, it is possible to maintain the usability while enhancing the safety of the battery 20C.

Fourth Embodiment

As shown in FIG. 4, the management device 50 includes the processing unit 51, the voltage measuring unit 55, the current measuring unit 57, the display unit 63, the communication unit 59, and the like.

In measurement ICs that handle analog values, such as the voltage measuring unit 55 and the current measuring unit 57, it is difficult to reduce the operable voltage from the viewpoint of maintaining measurement accuracy, and 5V is common. On the other hand, since the processing unit 51 handles only digital values, it has a lower operable voltage than the measurement ICs 55 and 57, such as 3.3V, 3.0V, and 1.5V. Also, the communication unit 59 has a lower operable voltage than the measurement ICs 55 and 57, which is 3.3V, for example.

In order to maintain the management function of the management device 50, at least the processing unit 51, the current measuring unit 55, the voltage measuring unit 57, and the communication unit 59 must maintain normal operation. Therefore, the operable voltage Vmin1 of the management device 50 is restricted to the maximum operating voltage among the processing unit 51, the current measuring unit 55, the voltage measuring unit 57, and the communication unit 59. In this example, 5V, which is the operating voltage of the measurement ICs 55 and 57, is the operable voltage Vmin1 of the management device 50.

As shown in FIG. 6, when the operable voltage Vmin2 of the processing unit 51 is lower than the operable voltage Vmin1 of the management device 50, even if the total voltage Vs of the assembled battery 30 becomes lower than the operable voltage Vmin1 of the management device 50, so that the measurement function of the voltage or the current is lost, the processing unit 51 can measure the time without stopping the function while the operable voltage Vmin2 is maintained.

That is, by using the processing unit 51 having the operable voltage Vmin2 lower than the total voltage Vs of the assembled battery 30 at the time when a large current flows due to an engine start or an external short circuit, the processing unit 51 can continue the operation during the power loss period.

Therefore, by measuring the power loss time Tab from the time to of power loss to the time tb of power restoration and comparing it with the threshold value in the processing unit 51, it is possible to determine whether the cause of the power loss is an "engine start" or an "external short circuit".

Figure 12:
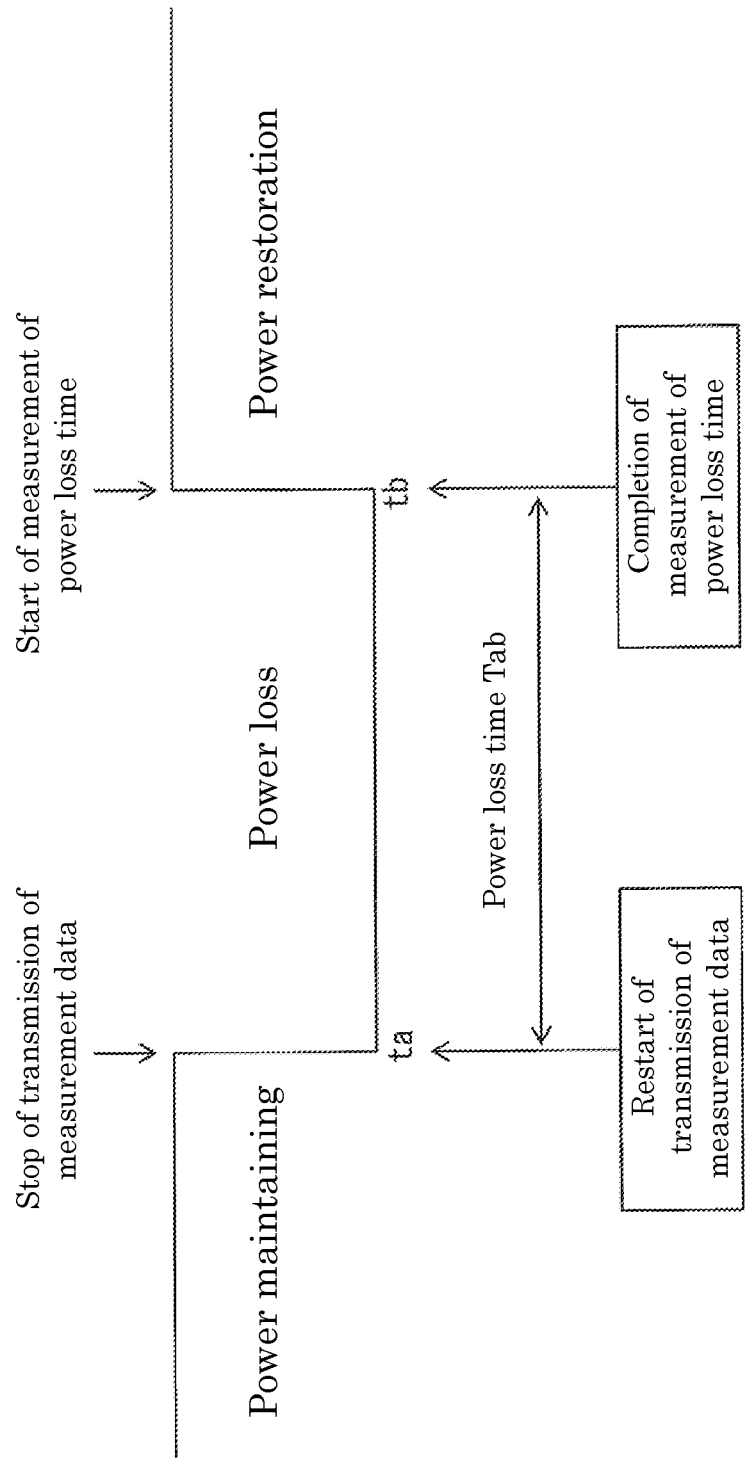
FIG. 12 is a diagram showing a power loss time.

As shown in FIG. 12, during the power loss, the voltage measuring unit 55 stops the transmission of the measurement data of the voltage value to the processing unit 51, and after the power is restored, the voltage measuring unit 55 periodically transmits the measurement data of the voltage value to the processing unit 51. Therefore, the processing unit 51 can determine the power loss or the power restoration from the reception state of the measurement data of the voltage value. That is, the power loss can be detected based on the stopping of reception of the measurement data from the voltage measuring unit 55, and the power restoration can be detected based on the restarting of reception of the measurement data.

Fifth Embodiment

In the first embodiment, whether the cause of the power loss is an "engine start" or an "external short circuit" is determined based on whether or not communication with the vehicle ECU 120 can be resumed after the power is restored.

As shown in FIG. 6, in the case of an engine start, after the rush current from the assembled battery 30 to the starter motor 110 flows, each time the crankshaft (not shown) makes one rotation, an overtorque is generated, so that an overcurrent flows through the starter motor 110. The overcurrent decreases as the crankshaft rotates. Therefore, as shown in FIG. 6, the voltage waveform at the time of an engine start is a waveform in which the voltage instantaneously greatly drops, and then the voltage drop amount attenuates stepwise.

On the other hand, in the case of an external short circuit, a constant short-circuit current flows from the time of occurrence to the time of resolving, so that the voltage waveform is rectangular as shown in FIG. 6. In this way, the voltage waveform differs significantly between the "time of an engine start" and the "external short circuit".

From the above, after the power is restored, the processing unit 51 can determine the cause of the power loss based on the voltage waveform of the total voltage Vs of the assembled battery 30 measured by the voltage measuring unit 55. When the voltage waveform of the total voltage Vs is a waveform that attenuates stepwise as indicated by the solid line A1 in FIG. 6, it can be determined that the cause of the power loss is an "engine start". On the other hand, when the voltage waveform of the total voltage Vs is a waveform that rises sharply as indicated by the broken line A2 in FIG. 6, it can be determined that the cause of the power loss is an "external short circuit".

The processing unit 51 does not execute the response operation according to the occurrence of the external short circuit if the cause of the power loss is an "engine start", and the processing unit 51 executes the response operation only if the cause of the power loss is an "external short circuit". With this, it is possible to maintain the usability while enhancing the safety of the battery 20A.

Sixth Embodiment

In the first embodiment, whether the cause of the power loss is an "engine start" or an "external short circuit" is determined based on whether or not communication with the vehicle ECU 120 can be resumed after the power is restored.

Figure 13:
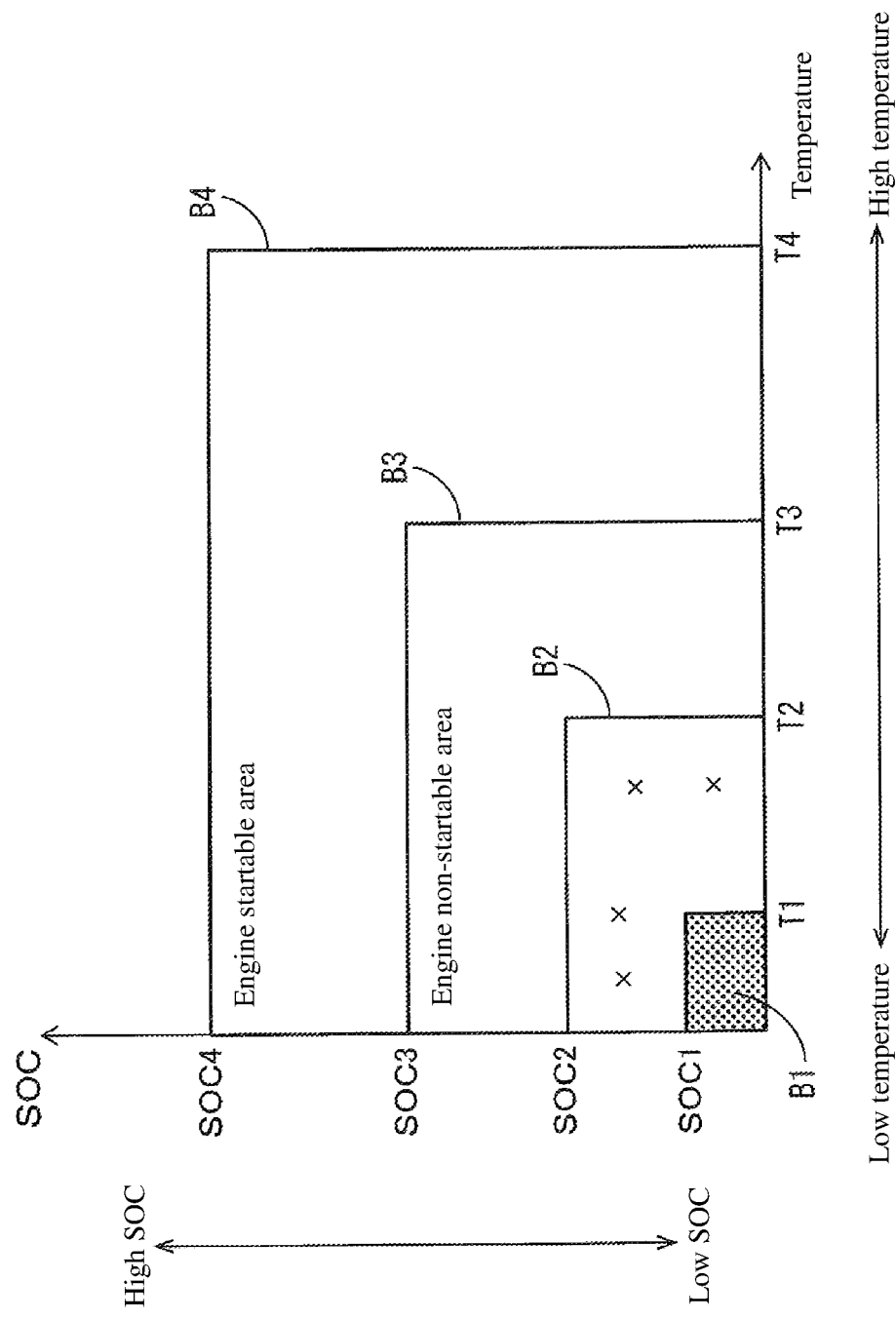
FIG. 13 is a diagram showing an engine startable area, an engine non-startable area, a range of occurrence of power loss due to an external short circuit, and a range of occurrence of power loss due to an engine start.

FIG. 13 shows, for the assembled battery 30, an occurrence area B1 of power loss due to an engine start, an occurrence area B2 of power loss due to an external short circuit, an engine non-startable area B3, and an engine startable area B4, in which the horizontal axis represents the temperature and the vertical axis represents SOC.

The reason why the power is lost at low SOC is that the total voltage Vs of the assembled battery 30 is lower than that at the time of full charge. The reason why power is lost at low temperature is that the internal resistance of the secondary battery 31 increases due to the temperature decrease. In particular, it is known that the lithium ion secondary battery 31 has a larger increase in internal resistance at low temperature than other secondary batteries. Further, the reason why the occurrence area B1 of power loss due to an engine start is smaller than the occurrence area B2 of power loss due to an external short circuit, and is included in the occurrence area B2 is that the cranking current is smaller than the short-circuit current, and the voltage drop amount is small.

In the sixth embodiment, the processing unit 51 monitors SOC and temperature of the assembled battery 30, and when the assembled battery 30 is included in the occurrence area B1, that is, SOC of the assembled battery 30 is SOC1 or less, and the temperature of the assembled battery 30 is less than T1, the processing unit 51 interrupts the current of the assembled battery 30 by using the current interruption device 41. SOC1 (threshold value of SOC) and T1 (threshold value of temperature) can be obtained in such a manner that SOC and the condition of the temperature are changed, and an experiment to start the engine is performed by rotating the starter motor 110 with the battery 20A so as to verify whether or not the management device 50 loses power. In addition, SOC1 and T1 can be obtained in such a manner that a voltage change of the assembled battery 30 accompanying the engine start is estimated from SOC, the temperature condition, and the cranking current value at the time of an engine start, and whether or not the management device 50 loses power is verified.

When the assembled battery 30 is included in the occurrence area B1, the current is interrupted and cranking cannot be performed, so that power loss due to an engine start does not occur. Therefore, when the power loss of the management device 50 occurs in the external area of the occurrence area B1 as indicated by the crosses in FIG. 13, (specifically, the area of the occurrence area B2 excluding the occurrence area B1), it can be determined that the cause is something other than the engine start, that is, an "external short circuit".

Since the occurrence area B1 is included in the engine non-startable area B3, even if the current is interrupted when the assembled battery 30 is included in the occurrence area B1, no problem occurs in actual use of the vehicle.

Other Embodiments

The present invention is not limited to the embodiment described above referring to the drawings, and, for example, the following embodiments are also included in the technical scope of the present invention.

(1) In the first embodiment, the secondary battery 31 is illustrated as an example of the energy storage device. The energy storage device is not limited to the secondary battery 31, but may be a capacitor. As the secondary battery 31, a nonaqueous electrolyte secondary battery such as a lithium ion secondary battery or a lead-acid battery can be used. Further, the energy storage device is not limited to the case where a plurality of energy storage devices are connected in series, and may have a single cell configuration. The vehicle is not limited to an automobile, and may be a motorcycle as long as it has a starter motor.

(2) In the first embodiment, an example is described in which the power line L1 on the positive electrode side of the management device 50 is drawn from the connection point J1 on the positive electrode side of the assembled battery 30 and the power line L2 on the negative electrode side is drawn from the connection point J2 on the negative electrode side of the assembled battery 30. The power line L3 on the negative electrode side may be drawn from the connection point J3 on the negative electrode side of the shunt resistor 45. Further, in the first embodiment, an example is described in which the battery 20A is provided with the current interruption device 41 and the fuse 43, but the current interruption device 41 and the fuse 43 may be omitted.

(3) In the first embodiment, the management device 50 includes the processing unit 51, the voltage measuring unit 55, the current measuring unit 57, the communication unit 59, the reset circuit 61, and the display unit 63. The management device 50 only needs to have a configuration including at least the processing unit 51 that manages the secondary battery 31 and performs a response operation. The voltage measuring unit 55, the current measuring unit 57, the communication unit 59, the reset circuit 61, and the display unit 63 may be provided outside the management device as long as they can communicate with the processing unit 51.

(4) In the second embodiment, it is determined whether the cause of the power loss is an "engine start" or an "external short circuit" based on whether or not there is a communication record at the time of power loss for the certain period T around the time of power loss.

When the battery 20B is a power source for not only the starter motor 15 but also vehicle loads such as audio equipment and a car navigation system, when the ignition switch 115 is turned on, a current flows from the assembled battery 30 to the vehicle loads. Therefore, as shown in FIG. 6, when the ignition switch 115 is turned on, the total voltage Vs of the assembled battery 30 thereafter decreases (times t1 to t2). On the other hand, the external short circuit occurs in the state where the battery 20B is removed from the vehicle 1, so that such a voltage change does not occur at the time of power loss. Therefore, when the power loss is detected, the waveform of the total voltage Vs of the assembled battery 30 for the certain period T around the time of power loss is stored in the non-volatile memory 53, and the data is read at the time of power restoration. Thus, it is possible to determine whether the cause of the power loss is an "engine start" or an "external short circuit". Further, the cause of the power loss may be determined not only from the total voltage Vs of the assembled battery 30 but also from the data of the current I. Further, the cause of the power loss may be determined based on the data of both the total voltage Vs and the current I of the assembled battery 30.

Figure 14:
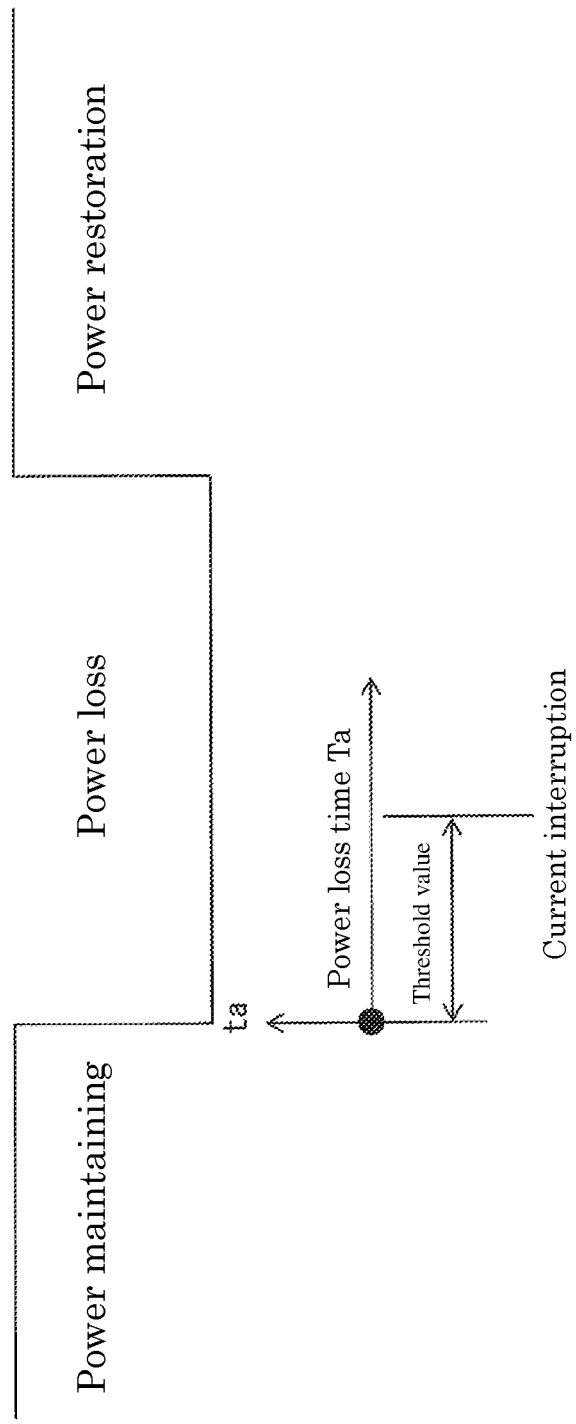
FIG. 14 is a diagram showing a power loss time.

(5) In the fourth embodiment, the power loss time Tab from the time ta of power loss to the time tb of power restoration is measured by the processing unit 51, and the result is compared with the threshold value to determine whether the cause of the power loss is an "engine start" or an "external short circuit". In addition to this, the power loss time Tab (elapsed time from the time ta of power loss) is measured in the processing unit 51, and when the power is not restored even if the power loss time Tab exceeds the threshold value, as shown in FIG. 14, it is also possible to determine that the cause of the power loss is an "external short circuit". In this case, the safety of the assembled battery 30 can be ensured by interrupting the current by the current interruption device 41 at the time when the power loss time Ta Tab exceeds the threshold value.

(6) In the fifth embodiment, whether the cause of the power loss is an "engine start" or an "external short circuit" is determined based on the data of the total voltage Vs of the assembled battery 30 measured by the voltage measuring unit 55 after the power is restored. The matter that the waveforms are different between the "engine start" and the "external short circuit" also applies in the current. Therefore, whether the cause of the power loss is an "engine start" or an "external short circuit" may be determined based on the data of the current I of the assembled battery 30 measured by the current measuring unit 57 after the power is restored. Further, the cause of the power loss may be determined based on the data of both the total voltage Vs and the current I of the assembled battery 30.

Figure 15:
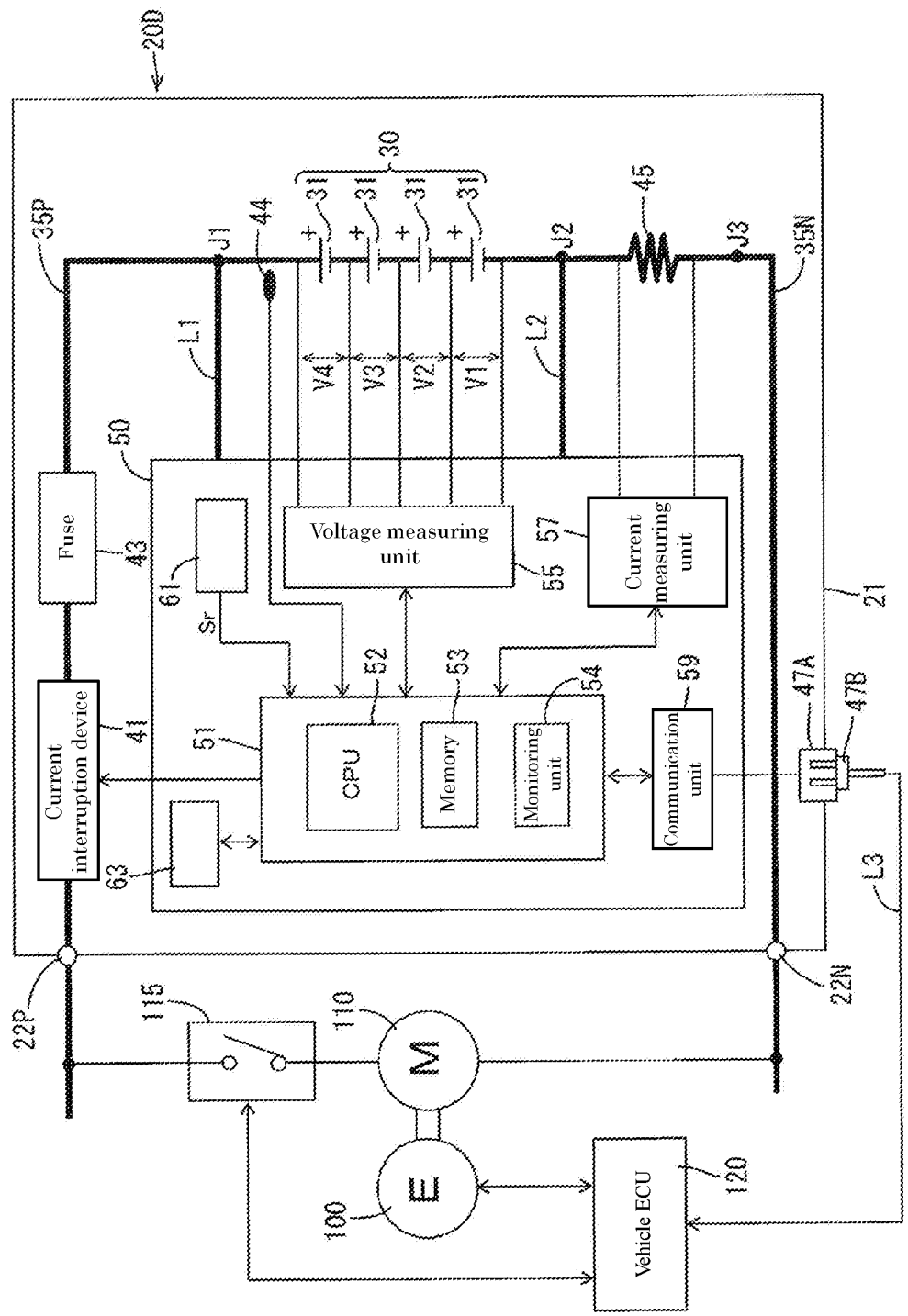
FIG. 15 is a block diagram showing another electrical configuration of a battery.

(7) In the first embodiment, the processing unit 51 includes the CPU 52 and the memory 53, and the CPU 52 performs the "monitoring of the state" of the assembled battery 30 and the "response operation according to the occurrence of the external short circuit". The processing unit 51 only needs to be configured to perform the "monitoring of the state" of the assembled battery 30 and the "response operation according to the occurrence of the external short circuit", and as shown in FIG. 15, a monitoring unit 54 may be provided in the processing unit 51 separately from the CPU 52 that monitors the state of the assembled battery 30. The monitoring unit 54 monitors the power loss of the CPU 52. When the CPU 52 has lost power (when the management device 50 has lost power), the monitoring unit 54 determines whether the cause is "an engine start" or an "external short circuit" based on whether or not communication can be resumed, and the like. The monitoring unit 54 performs the response operation according to the occurrence of the external short circuit in the case of the "external short circuit", and does not perform the response operation in the case of the "engine start".

(8) In the sixth embodiment, the occurrence area B1 of power loss due to an engine start is defined by SOC and temperature. The occurrence area B1 of power loss due to an engine start may be defined by either SOC or temperature. In this case, the occurrence area B1 only needs to be defined by using a factor that has a larger influence on the voltage drop of the secondary battery 31 between SOC and temperature.

The invention claimed is:

1. A management device for an energy storage device, at least comprising a processor configured to manage the energy storage device,
wherein, when the management device for the energy storage device has lost power due to a voltage drop of the energy storage device, the processor is configured to determine whether a cause of power loss is an external short circuit between external terminals of the energy storage device, and the processor is configured to execute a response operation according to an occurrence of the external short circuit in a case of the external short circuit, and does not execute the response operation in a case of an engine start.

2. The management device according to claim 1, wherein the processor determines whether the cause of the power loss is an external short circuit or an engine start based on whether or not communication with an electronic controller mounted in a vehicle can be resumed after the power is restored.

3. The management device according to claim 1,
wherein, when the power is lost, the processor is supplied with power from an auxiliary power source and records a communication record with an electronic controller mounted in a vehicle for a certain period around a time of power loss or measurement data of the energy storage device for the certain period in a non-volatile memory, and
wherein, after the power is restored, the processor determines whether the cause of the power loss is an external short circuit or an engine start based on the communication record with the electronic controller or the measurement data of the energy storage device stored in the memory.

4. The management device according to claim 1, wherein the processor determines whether the cause of the power loss is an external short circuit or an engine start based on a power loss time during which the management device loses power.

5. The management device according to claim 1, wherein the processor determines whether the cause of the power loss is an external short circuit or an engine start based on the measurement data of the energy storage device after the power is restored.

6. The management device according to claim 1,
wherein a first area in which power loss is expected to occur due to an engine start is defined by at least one of SOC (State of Charge) and temperature of the energy storage device, and
wherein the processor interrupts a current of the energy storage device when the energy storage device is included in the first area.

7. The management device according to claim 1, wherein the response operation includes a protection operation for the energy storage device or a notification operation of reporting an abnormality.

8. An energy storage apparatus comprising:
an energy storage device;
the management device according to claim 1; and
a case that includes an external terminal for connecting the energy storage device to an engine starter, and accommodates the energy storage device and the management device.

9. A management method for an energy storage device, the management method comprising:
determining whether a cause of power loss of a management device is an external short circuit between external terminals; and
executing a response operation according to an occurrence of the external short circuit of the energy storage device.

10. The method according to claim 9, further comprising determining whether the cause of the power loss is an external short circuit or an engine start based on whether or not communication with an electronic controller mounted in a vehicle can be resumed after the power is restored.

11. The method according to claim 9, further comprising:
supplying to a processor, according to whether a power is lost, with power from an auxiliary power source and recording a communication record with an electronic controller mounted in a vehicle for a certain period around a time of power loss or measurement data of the energy storage device for the certain period in a non-volatile memory, and wherein, after the power is restored, the determining by processor whether the cause of the power loss is an external short circuit or an engine start based on the communication record with the electronic controller or the measurement data of the energy storage device stored in the memory.

12. The method according to claim 9, further comprising determining whether the cause of the power loss is an external short circuit or an engine start based on a power loss time during which the management device loses power, or based on the measurement data of the energy storage device after the power is restored, wherein the response operation includes a protection operation for the energy storage device or a notification operation of reporting an abnormality.

13. A management device for an energy storage device, the management device comprising:

a processor configured to manage the energy storage device, the processor is configured to:
when the management device for the energy storage device has lost power due to a voltage drop of the energy storage device, determining whether a cause of power loss is an external short circuit between external terminals of the energy storage device; and
executing a response operation according to an occurrence of the external short circuit in a case of the external short circuit.

14. The management device according to claim 13, wherein the processor determines whether the cause of the power loss is an external short circuit or an engine start based on whether or not communication with an electronic controller mounted in a vehicle can be resumed after the power is restored.

15. The management device according to claim 13, wherein, when the power is lost, the processor is supplied with power from an auxiliary power source and records a communication record with an electronic controller mounted in a vehicle for a certain period around a time of power loss or measurement data of the energy storage device for the certain period in a non-volatile memory, and wherein, after the power is restored, the processor determines whether the cause of the power loss is an external short circuit or an engine start based on the communication record with the electronic controller or the measurement data of the energy storage device stored in the memory.

16. The management device according to claim 13, wherein the processor determines whether the cause of the power loss is an external short circuit or an engine start based on a power loss time during which the management device loses power.

17. The management device according to claim 13, wherein the processor determines whether the cause of the power loss is an external short circuit or an engine start based on the measurement data of the energy storage device after the power is restored.

18. The management device according to claim 13, wherein a first area in which power loss is expected to occur due to an engine start is defined by at least one of SOC (State of Charge) and temperature of the energy storage device, and wherein the processor interrupts a current of the energy storage device when the energy storage device is included in the first area.

19. The management device according to claim 13, wherein the response operation includes a protection operation for the energy storage device or a notification operation of reporting an abnormality.

20. An energy storage apparatus comprising:
an energy storage device;
the management device according to claim 13; and
a case that includes an external terminal for connecting the energy storage device to an engine starter, and accommodates the energy storage device and the management device.

* * * * *